(12) United States Patent
McAlpine et al.

(10) Patent No.: US 12,234,558 B2
(45) Date of Patent: Feb. 25, 2025

(54) APPARATUS, COMPOSITIONS, AND METHODS FOR STAINLESS-COATED STEEL REINFORCEMENT BAR

(71) Applicants: Samuel McAlpine, Durham, NC (US); Steven Jepeal, Salem, MA (US)

(72) Inventors: Samuel McAlpine, Durham, NC (US); Steven Jepeal, Salem, MA (US)

( * ) Notice: Subject to any disclaimer, the term of this patent is extended or adjusted under 35 U.S.C. 154(b) by 163 days.

(21) Appl. No.: 17/861,129

(22) Filed: Jul. 8, 2022

(65) Prior Publication Data

US 2023/0012077 A1 Jan. 12, 2023

Related U.S. Application Data

(60) Provisional application No. 63/255,520, filed on Oct. 14, 2021, provisional application No. 63/219,436,
(Continued)

(51) Int. Cl.
*C23C 24/08* (2006.01)
*B22F 9/04* (2006.01)
(Continued)

(52) U.S. Cl.
CPC ............ *C23C 24/085* (2013.01); *B22F 9/04* (2013.01); *B22F 9/082* (2013.01); *C21D 1/34* (2013.01);
(Continued)

(58) Field of Classification Search
None
See application file for complete search history.

(56) References Cited

U.S. PATENT DOCUMENTS

| 10,975,459 B2* | 4/2021 | Nakamura | ............ C22C 38/001 |
| 2018/0304583 A1* | 10/2018 | Brückner | .............. B32B 15/043 |

(Continued)

FOREIGN PATENT DOCUMENTS

| CN | 103422088 A | 12/2013 |
| CN | 103614686 A | 3/2014 |

(Continued)

OTHER PUBLICATIONS

International Search Report and Written Opinion for International Application No. PCT/US2022/036590, mailed Nov. 16, 2022 (12 pages).

(Continued)

*Primary Examiner* — Daniel J. Schleis
(74) *Attorney, Agent, or Firm* — Nutter McClennen & Fish LLP

(57) ABSTRACT

In some embodiments, a coating applied to steel reinforcement bar (e.g., steel rebar) that could considerably extend the lifetime of concrete structures by reducing steel rebar corrosion is disclosed. The coating includes a thin, passivating steel (e.g., stainless steel) layer that is applied to the outside of conventional steel rebar. The coating can be applied in-line through metal cold spray manufacturing, which is a high throughput coating technique that can be integrated into existing steel manufacturing plants. Furthermore, a novel, high performance ferritic steel with tailored resistance to corrosion from chlorides is described. The new ferritic steel is distinct from other commercial and experimental steels, and is better suited for coating low-cost steel structures like rebar. Multiple alloying elements including Cr, Al, and Si will each form protective oxides independently, increasing the total amount of protection and extending it over much wider ranges of pH and electrical potential.

16 Claims, 30 Drawing Sheets

Related U.S. Application Data filed on Jul. 8, 2021, provisional application No. 63/219,434, filed on Jul. 8, 2021.

(51) Int. Cl.

| | |
|---|---|
| *B22F 9/08* | (2006.01) |
| *C21D 1/34* | (2006.01) |
| *C21D 6/00* | (2006.01) |
| *C21D 8/06* | (2006.01) |
| *C21D 8/08* | (2006.01) |
| *C21D 9/00* | (2006.01) |
| *C22C 33/04* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/22* | (2006.01) |
| *C22C 38/44* | (2006.01) |
| *C23C 4/00* | (2016.01) |
| *C23C 24/04* | (2006.01) |
| *C23F 17/00* | (2006.01) |

(52) U.S. Cl.
CPC ............. *C21D 6/002* (2013.01); *C21D 6/004* (2013.01); *C21D 6/008* (2013.01); *C21D 8/065* (2013.01); *C21D 8/08* (2013.01); *C21D 9/0075* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/44* (2013.01); *C23C 4/00* (2013.01); *C23C 24/04* (2013.01); *C23F 17/00* (2013.01); *B22F 2301/35* (2013.01); *C21D 2211/001* (2013.01); *C21D 2211/005* (2013.01)

(56) References Cited

U.S. PATENT DOCUMENTS

| | | |
|---|---|---|
| 2019/0344315 A1 | 11/2019 | Yan et al. |
| 2023/0009856 A1 | 1/2023 | McAlpine et al. |
| 2023/0011175 A1 | 1/2023 | McAlpine et al. |

FOREIGN PATENT DOCUMENTS

| | | |
|---|---|---|
| CN | 110225989 A | 9/2019 |
| CN | 111440983 A | 7/2020 |
| CN | 112458369 A | 3/2021 |
| JP | 2016204714 A | 12/2016 |
| KR | 1020150074978 A | 7/2015 |
| WO | 2017056452 A1 | 4/2017 |

OTHER PUBLICATIONS

McCune, R.C., Donlon, W.T., Popoola, O.O. et al., "Characterization of copper layers produced by cold gas-dynamic spraying," (2000 ). J Therm Spray Tech 9, pp. 73-82. (Year: 2000).
Tucker Jr., Robert C., (2013). ASM Handbook, vol. 05A—Thermal Spray Technology. ASM International. (Year: 2013).
N.E. Hakiki and M. Da Cunha Belo 1996 J. Elecgtrochem. Soc. 143 3088. (Year: 1996).
Kay, C. M. Kathrikeyan, J., (2016). "High Pressure Cold Spray—Principles and Applications." ASM International. (Year: 2016).
Lecka, K. M., A. J. Antonczak, P. Kowalewski, and M. Trzcinski. "wear resistance of laser-induced annealing of AISI 316 (EN 1.4401) stainless steel." Laser Physics 28,.
Office Action for U.S. Appl. No. 17/861,028 dated Sep. 14, 2023, 18 pages.
Office Action for U.S. Appl. No. 17/861,028 dated Mar. 28, 2024, 20 pages.
Office Action for U.S. Appl. No. 17/861,047 dated Dec. 8, 2023, 7 pages.
Office Action for U.S. Appl. No. 17/861,047 dated Jul. 9, 2024, 8 pages.

\* cited by examiner

APPARATUS, COMPOSITIONS, AND METHODS FOR STAINLESS-COATED STEEL REINFORCEMENT BAR

PRIORITY

This patent application claims priority from Provisional U.S. Patent Application No. 63/255,520, filed on Oct. 14, 2021, entitled, "INTEGRATED HIGH THROUGHPUT COLD SPRAY COATING MANUFACTURING SYSTEM," and naming Samuel McAlpine and Steven Jepeal as inventors, the disclosure of which is incorporated herein, in its entirety, by reference.

This patent application also claims priority from Provisional U.S. Patent Application No. 63/219,436, filed on Jul. 8, 2021, entitled, "CORROSION-RESISTANT FERRITIC STAINLESS STEEL," and naming Samuel McAlpine and Steven Jepeal as inventors, the disclosure of which is incorporated herein, in its entirety, by reference.

This patent application also claims priority from Provisional U.S. Patent Application No. 63/219,434, filed on Jul. 8, 2021, entitled, "STAINLESS-COATED STEEL REINFORCEMENT BAR," and naming Samuel McAlpine and Steven Jepeal as inventors, the disclosure of which is incorporated herein, in its entirety, by reference.

BACKGROUND

Steel reinforcement bar (rebar) is used to increase the strength of concrete under tension and shear, but the uncoated bar has little resistance to corrosion. When the steel reinforcement (rebar) corrodes, it expands in volume, and eventually pushes apart and cracks the concrete around it. Given sufficient corrosion, this leads to major structural issues such as spalling of the concrete, where sections of concrete break off, and delamination, where wide layers of cracking separate the reinforcement from the concrete surrounding it. In either case, this corrosion causes substantial structural damage to the concrete, risking catastrophic failure and necessitating major repair or replacement.

With regard to steel rebar, after fabrication, the bar can corrode in the presence of atmospheric humidity or rain, leading to the formation of an undesirable iron oxide on the outer surface, which diminishes the marketability of the rebar. After the rebar is impregnated into concrete, corrosion can cause substantial structural degradation, often through pitting corrosion due to the presence of chloride ions. This later form of corrosion can severely limit the lifetime of concrete structures using steel rebar.

Several methods exist for improving the corrosion resistance of steel rebar. Many of these options present a high additional cost to the steel rebar and have inherent limitations to efficacy. Epoxy coatings, for example, are known to delaminate from rebar when in service, and therefore provide very limited corrosion resistance. The zinc layer produced during galvanization is prone to attack by the liquid concrete mixture during concrete solidification, reducing its efficacy and requiring thicker applied layers and therefore higher costs. In addition and by way of further example, both galvanization, through the hot dip application method, and epoxy coating present additional manufacturing steps that are not easily integrated into modern, high-throughput manufacturing methods for steel rebar.

Pure stainless steel rebars and stainless-cladded steel rebars exist, but at a cost that is prohibitively expensive for most applications.

SUMMARY OF VARIOUS EMBODIMENTS

In accordance with an embodiment of the invention, a steel component includes a carbon steel reinforcement bar, and an outer layer coating metallurgically bonded to the steel component and comprising a ferritic stainless steel. The outer layer coating forms a corrosion resistant coating on the steel component. A mean thickness of the outer layer is between 10 microns and 300 microns.

There may be an interdiffusion region between the carbon steel reinforcement bar and the outer layer coating where a composition of the interdiffusion region varies continuously from a composition of the coating to a composition of the carbon steel reinforcement bar. A width of the interdiffusion region may be between 10 nanometers and 10 microns The stainless steel coating may include a cold sprayed coating, a thermal sprayed coating, a plasma sprayed coating, a laser deposited coating, a twin wire arc sprayed coating, or an arc welding overlay coating. The stainless steel coating may have a mean thickness of between 20 microns and 100 microns. The stainless steel coating may include at least one of 316 stainless steel, 2205 stainless steel, or 304 stainless steel. The at least one of 316 stainless steel, 2205 stainless steel, or 304 stainless steel may be mixed with a metal carbide or a metal oxide. The metal carbide may include at least one of chromium carbide, molybdenum carbide, silicon carbide, or manganese carbide.

In some embodiments, the stainless steel coating includes:
12-25 weight percent chromium (Cr);
2-10 weight percent molybdenum (Mo); and at least one or more of:
0-10 weight percent aluminum (Al);
0-5 weight percent silicon (Si);
0-5 weight percent nickel (Ni);
0-1.0 weight percent manganese (Mn);
0.0-0.1 weight percent carbon (C);
0.0-0.1 weight percent nitrogen (N); or
0.0-0.05 weight percent sulfur (S); and
the balance of iron (Fe).

In some embodiments, the stainless steel coating includes:
16-20 weight percent chromium (Cr);
3-6 weight percent molybdenum (Mo); and at least one or more of:
0-4 weight percent aluminum (Al);
0-2 weight percent silicon (Si);
0-0.1 weight percent nickel (Ni);
0.1-0.5 weight percent manganese (Mn);
0.0-0.1 weight percent carbon (C);
0.0-0.1 weight percent nitrogen (N): or
0.0-0.05 weight percent sulfur (S); and
the balance of iron (Fe).

The stainless steel coating may comprise a face-centered cubic crystal structure. The stainless steel coating may comprise a ferritic/austenitic duplex microstructure. The stainless steel coating may be a ferritic stainless steel. The stainless steel coating may have a sufficient ductility that the reinforcement bar may be bent up to 180 degrees around an object of a diameter 3.5 times a diameter of the reinforcement bar without visible cracking of the stainless steel coating. The stainless steel coating may have a sufficient ductility that the stainless steel coating has an intrinsic ductility allowing at least a 5% elongation before failure.

In accordance with another embodiment of the invention, a stainless steel coated steel component includes a steel component, and a corrosion resistant ferritic stainless steel coating metallurgically bonded to the steel component. The stainless steel coating may passivate the steel component against corrosion. The stainless steel coating may be a cold sprayed coating. The stainless steel coating may be a weld overlay coating. The stainless steel coating may be a twin wire arc spray coating. The stainless steel coating may be laser cladding. The stainless steel coating may be thermal spray coating. A mean grain size of the stainless steel coating may be between 500 nanometers and 10 microns.

In some embodiments, the stainless steel coating includes:
16-20 weight percent chromium (Cr);
3-6 weight percent molybdenum (Mo); and at least one or more of:
0-4 weight percent aluminum (Al);
0-2 weight percent silicon (Si);
0-0.1 weight percent nickel (Ni);
0.1-0.5 weight percent manganese (Mn);
0.0-0.1 weight percent carbon (C);
0.0-0.1 weight percent nitrogen (N): or
0.0-0.05 weight percent sulfur (S); and
the balance of iron (Fe).

In accordance with another embodiment of the invention, a method of forming a steel component includes providing a steel component having an outer surface, and coating at least a portion of the outer surface with an outer layer including a layer of ferritic stainless steel forming a metallurgical bond to the outer surface. The metallurgically bonded outer layer coating forming a corrosion resistant coating on the steel component.

In some embodiments, the coating may include providing a carrier gas at a high pressure in a first gas flow path to a gas heater to heat the carrier gas to a high temperature along the first gas flow path. The coating may include providing the carrier gas at a high pressure in a second gas flow path to a particle feeder of stainless steel particles that are carried by the carrier gas along the second gas flow path. The coating may include mixing the heated carrier gas in the first flow path with the carried stainless steel particles in the second flow path at an array of spray nozzles in fluidic communication with the first and second flow paths. The coating may include ejecting a plume of gas and stainless steel particles from the array of nozzles to coat the outer surface of the steel component with a coating of stainless steel as the steel component is transported through the plume. The ejected stainless steel particles may impact the surface of the steel component at a high velocity and form a metallurgical bond to the surface of the steel component to form an outer coating of ferritic stainless steel. The high velocity may be a supersonic velocity.

In some embodiments, the array of nozzles circumscribes the steel component to provide coverage of the steel component by the plume. The high pressure may be between about 700 psi and about 800 psi. The high temperature of the heated gas is between about 900 C and about 1100 C.

In some embodiments, the stainless steel particles may have a mean particle size of between 5 microns and 25 microns. The stainless steel coating may have a mean thickness of between 10 microns and 300 microns. Further, the stainless steel coating may have a mean thickness of between 20 microns and 100 microns.

In some embodiments, the component may be a steel rail, a steel beam, a steel girder, a steel rod, a steel bar, or a steel pipe. In some embodiments, the component may be a steel billet.

In some embodiments, the method of forming a steel component may further include heating the coated steel billet to a temperature between 1000 C and 1300 C. The method of forming a steel component may further include rolling, sequentially, the coated stainless steel billet into a deformed reinforcement bar. The method of forming a steel component may further include coating the deformed reinforcement bar with an outer layer comprising a layer of ferritic stainless steel forming a metallurgical bond to an outer surface of the deformed reinforcement bar. The method of forming a steel component may further include heat treating the coated deformed reinforcement bar. The heat treating may include laser heating.

In some embodiments, the steel component includes a steel billet. The steel billet may have a rectilinear cross section. The array of spray nozzles may circumscribe the steel billet in a rectilinear configuration to ensure there is an unobstructed line of sight between each region of the surface of the billet and at least one of the nozzles in the array of nozzles. The stainless steel coating may cover the external surface of the steel billet.

In accordance with an embodiment of the invention, a coating deposition system for applying a coating of stainless steel to a surface of a steel component includes a gas input for fluidly coupling with a high pressure gas supply configured to provide a gas at a high pressure to one or more flow paths. The coating deposition system also includes a heated gas flow path in thermal communication with a gas heater, and the heated gas flow path is in fluidic communication with the high pressure gas supply. The gas heater is configured to heat the high pressure flowing gas in the heated gas flow path. The system also includes a stainless steel particle feeder flow path in particulate communication with a feeder input for receiving a source of stainless steel particles. The stainless steel particle feeder flow path is in fluidic communication with the high pressure gas supply. The stainless steel particle feeder is configured to supply the stainless steel particles to the high pressure flowing gas in the stainless steel particle feeder flow path.

The system also includes an array of spray nozzles in fluidic communication with the heated gas flow path and the stainless steel particle feeder flow path. The array of spray nozzles is in particulate communication with the stainless steel particle feeder flow path. The array of spray nozzles is configured to circumscribe the steel component so that there is an unobstructed line of sight between each region of the surface of the steel component and at least one of the nozzles in the array of nozzles. The array of spray nozzles is also configured to accelerate the stainless steel particles by a force imparted by a high velocity of the heated gas exiting each of the nozzles in the array of nozzles in a plume of heated gas and stainless steel particles. The array of spray nozzles is further configured so that the stainless steel particles impact the surface of the component at the high velocity and metallurgically bond to the surface of the component to form the stainless steel coating. The stainless steel coating is ferritic, austenitic, or duplex. At least one of the spray nozzles produces a stream of stainless steel particles at least partially in a longitudinal direction and at least partially in a radial direction.

In some embodiments, the array of spray nozzles may be in particulate communication with the stainless steel particle feeder flow path. The array of spray nozzles may be configured so that for each nozzle in the array of nozzles the heated gas and particles may enter the nozzle. The heated gas may be compressed through a converging section of the nozzle. The heated gas may then be expanded through a diverging section of the nozzle. After passing through the converging and diverging sections of the nozzle, the heated gas and stainless steel particles may exit the nozzle in the plume and impact the surface of the steel component at supersonic velocities.

In some embodiments, the system may further include a conveyor configured for the transportation of the component through the plume of hot gas and stainless steel particles. The component may have a rectilinear cross section. The array of spray nozzles may be configured to circumscribe the rectilinear cross section with heads of each of the nozzles in the array of spray nozzles in a rectilinear arrangement.

Further, he component may have a circular, ovular, or deformed-circular cross section. The array of spray nozzles may be configured to circumscribe the circular, ovular, or deformed-circular cross sections with heads of each of the nozzles in the array of spray nozzles in a circular, ovular, or deformed-circular cross section arrangement, respectively.

In some embodiments, the gas may include at least one of nitrogen ($N_2$), helium (He), air, argon (Ar), xenon (Xe), or forming gas (5% $H_2$ in $N_2$). The high pressure may be between about 700 psi and about 800 psi. The temperature of the heated gas may be between about 900 C and about 1100 C. The high velocity may be supersonic velocity. The stainless steel particles may have a mean particle size of between 5 microns and 20 microns. The stainless steel coating may have a mean thickness of between 0.5 mm and 5 mm. The stainless steel coating may have a mean thickness of between 35 microns and 350 microns. The stainless steel coating may have a mean thickness of between 25 microns and 300 microns. The stainless steel coating may have a mean thickness of between 10 microns and 100 microns. The stainless steel coating may have a BCC ferrite matrix.

In some embodiments, the stainless steel particles may include:
  16-20 weight percent chromium (Cr);
  3-6 weight percent molybdenum (Mo); and at least one or more of:
  0-4 weight percent aluminum (Al);
  0-2 weight percent silicon (Si);
  0-0.1 weight percent nickel (Ni);
  0.1-0.5 weight percent manganese (Mn);
  0.0-0.1 weight percent carbon (C);
  0.0-0.1 weight percent nitrogen (N): or
  0.0-0.05 weight percent sulfur (S); and
  the balance of iron (Fe).

In accordance with another embodiment of the invention, a method of applying a stainless steel coating to a steel component includes providing a carrier gas at a high pressure in a first gas flow path to a gas heater to heat the carrier gas to a high temperature along the first gas flow path. The method of applying a stainless steel coating to a steel component includes providing the carrier gas at a high pressure in a second gas flow path to a particle feeder of stainless steel particles that are carried by the carrier gas along the second gas flow path. The method includes mixing the heated carrier gas in the first flow path with the carried stainless steel particles in second flow path at an array of spray nozzles in fluidic communication with the first and second flow paths. The method also includes ejecting a plume of gas and stainless steel particles from the array of nozzles to coat an outer surface of the steel component with a coating of ferritic stainless steel as it is transported through the plume. The ejected stainless steel particles impact the surface of the steel component at a high velocity and form a metallurgical bond to the surface of the steel component to form an outer coating comprising ferritic stainless steel.

Each of the nozzles in the array of nozzles may compresses the mixed heated carrier gas and particles through a converging section of each nozzle. Each of the nozzles in the array of nozzles may expand the mixed heated carrier gas and particles through a diverging section of each nozzle. Each of the nozzles in the array of nozzles may accelerate the mixed heated carrier gas and particles to supersonic velocities.

In some embodiments, the stainless steel particles comprise at least one of 316 stainless steel, 2205 stainless steel, or 304 stainless steel.

The steel component may be a steel billet. The steel billet may have a rectilinear cross section. The array of spray nozzles may circumscribe the steel billet in a rectilinear configuration to ensure there is an unobstructed line of sight between each region of the surface of the billet and at least one of nozzles in the array of spray nozzles. The stainless steel coating may cover the entire external surface of the steel billet, and the thickness of the stainless steel coating may be between 150 microns and 500 microns. The stainless steel coating may be between 150 microns and 2000 microns.

The method may further include heating the stainless steel coating on the steel billet at 1200 C for a duration between about 3 hours and about 9 hours. The method may further include hot rolling the stainless steel coating on the steel billet to form a rebar component having the stainless steel coating. In some embodiments, the stainless steel coating may have a ceramic material alloyed with the stainless steel to improve the bonding of the stainless steel coating to the steel component. The ceramic material comprises at least one of a metal carbide or a metal oxide.

In some embodiments, the stainless steel particles may include at least one of spherical particles fabricated through gas atomization, near-spherical particles fabricated through high pressure water atomization, or irregular shaped particles fabricated through mechanical crushing.

The method may further include heat treating the stainless steel coating on the steel component. The heat treating the stainless steel coating on the steel component may include a laser heat treatment.

The heat treating the stainless steel coating on the steel component may include heating the stainless steel coating on the steel component to approximately 1100 C for 1 hour. The heat treating the stainless steel coating on the steel component may include quenching the stainless steel coating on the steel component to room temperature. The heat treating the stainless steel coating on the steel component may include tempering the stainless steel coating on the steel component at approximately 600 C for 1 hour.

In accordance with an embodiment of the invention, a corrosion resistant stainless steel alloy composition having a BCC ferrite matrix includes:
  12-25 weight percent chromium (Cr);
  2-10 weight percent molybdenum (Mo); and at least one or more of:
  0-10 weight percent aluminum (Al);
  0-5 weight percent silicon (Si);
  0-5 weight percent nickel (Ni);
  0-1.0 weight percent manganese (Mn);
  0.0-0.1 weight percent carbon (C);
  0.0-0.1 weight percent nitrogen (N); and
  0.0-0.05 weight percent sulfur (S); and
  the balance of iron (Fe).

In some embodiments, the corrosion resistant stainless steel alloy composition having a BCC ferrite matrix may include:
  16-20 weight percent chromium (Cr);
  3-6 weight percent molybdenum (Mo); and at least one or more of:
  0-4 weight percent aluminum (Al);
  0-2 weight percent silicon (Si);

0-0.1 weight percent nickel (Ni);
0.1-0.5 weight percent manganese (Mn);
0.0-0.1 weight percent carbon (C);
0.0-0.1 weight percent nitrogen (N):
0.0-0.05 weight percent sulfur (S); and
the balance of iron (Fe).

In some embodiments, the corrosion resistant stainless steel alloy composition having a BCC ferrite matrix may include:
18 weight percent chromium (Cr);
6 weight percent molybdenum (Mo);
4 weight percent aluminum (Al);
2 weight percent silicon (Si); and
the balance of iron (Fe).

In some embodiments, the corrosion resistant stainless steel alloy composition having a BCC ferrite matrix may include:
18 weight percent chromium (Cr);
3 weight percent molybdenum (Mo);
4 weight percent aluminum (Al);
2 weight percent silicon (Si); and
the balance of iron (Fe).

In some embodiments, the corrosion resistant stainless steel alloy composition having a BCC ferrite matrix may include:
18 weight percent chromium (Cr);
8 weight percent molybdenum (Mo);
5 weight percent aluminum (Al); and
the balance of iron (Fe).

In some embodiments, the corrosion resistant stainless steel alloy composition having a BCC ferrite matrix may include:
18 weight percent chromium (Cr);
8 weight percent molybdenum (Mo);
2 weight percent silicon (Si); and
the balance of iron (Fe).

In some embodiments, the corrosion resistant stainless steel alloy composition having a BCC ferrite matrix may include:
18 weight percent chromium (Cr);
4 weight percent molybdenum (Mo); and
the balance of iron (Fe).

In accordance with another embodiment of the invention, a method of making a corrosion resistant ferritic BCC stainless steel alloy includes providing a metal mixture that includes:
12-25 weight percent chromium (Cr);
2-10 weight percent molybdenum (Mo); and at least one or more of:
0-10 weight percent aluminum (Al);
0-5 weight percent silicon (Si);
0-5 weight percent nickel (Ni);
0-1.0 weight percent manganese (Mn);
0.0-0.1 weight percent carbon (C);
0.0-0.1 weight percent nitrogen (N); or
0.0-0.05 weight percent sulfur (S); and
the balance of iron (Fe).

The method of making a corrosion resistant ferritic BCC stainless steel alloy also includes providing a furnace for melting the metal mixture, heating the metal mixture in the furnace to form a liquid metal mixture melt, and cooling the liquid metal mixture melt to form a solid metal mixture. The solid metal mixture comprises a corrosion resistant ferritic stainless steel alloy. The furnace may be a vacuum induction melting furnace. The furnace may be a vacuum arc melting furnace. Cooling the liquid metal mixture melt may include quenching the liquid metal mixture melt.

The method of making a corrosion resistant ferritic BCC stainless steel alloy may further include atomizing the corrosion resistant ferritic stainless steel alloy to produce corrosion resistant stainless steel alloy particles. The method may include providing the corrosion resistant stainless steel alloy particles to a cold spray system. The method may include coating a steel component with the corrosion resistant stainless steel alloy particles ejected from the cold spray system. The ejected corrosion resistant stainless steel alloy particles may metallurgically bond to an outer surface of a steel component to form a corrosion resistant stainless steel coating having a BCC ferrite matrix on the steel component.

The method of making a corrosion resistant ferritic BCC stainless steel alloy may further include heat treating the corrosion resistant stainless steel coating having a BCC ferrite matrix on the steel component. The heat treating the corrosion resistant stainless steel coating having a BCC ferrite matrix may include a laser heat treatment.

The heat treating the corrosion resistant stainless steel coating having a BCC ferrite matrix may include heating the corrosion resistant coating on the component to a temperature between approximately 1000 C and approximately 1300 C for a duration between 1 hour and 24 hours. The heat treating may include quenching the corrosion resistant coating on the steel component. The heat treating may include tempering the corrosion resistant coating on the steel component at a temperature between 400 C and 700 C for a duration between 10 minutes and 4 hours.

The atomizing the corrosion resistant stainless steel alloy may include at least one of gas atomizing the corrosion resistant ferritic stainless steel alloy to produce spherical particles of the corrosion resistant stainless steel alloy, atomizing the corrosion resistant ferritic stainless steel alloy to produce near-spherical particles of the corrosion resistant stainless steel alloy, or mechanically crushing the corrosion resistant ferritic stainless steel alloy to produce irregular shaped particles of the corrosion resistant stainless steel alloy.

The corrosion resistant stainless steel alloy particles may have a mean particle size of between 5 microns and 20 microns. The stainless steel coating may have a mean thickness of between 10 microns and 500 microns.

The component may be a steel billet. The component may be a steel rebar, a steel beam, a steel rail track, or a steel pipe.

In accordance with another embodiment of the invention, a method of making a ferritic stainless steel alloy includes providing a metal mixture comprising:
12-25 weight percent chromium (Cr);
2-10 weight percent molybdenum (Mo); and at least one or more of:
0-10 weight percent aluminum (Al);
0-5 weight percent silicon (Si);
0-5 weight percent nickel (Ni);
0-1.0 weight percent manganese (Mn);
0.0-0.1 weight percent carbon (C);
0.0-0.1 weight percent nitrogen (N); or
0.0-0.05 weight percent sulfur (S); and
the balance of iron (Fe).

The method of making a ferritic stainless steel alloy also includes providing a furnace for melting the metal mixture. The metal mixture is heated in the furnace to a temperature between about 1600 C and about 2000 C to form a liquid metal mixture melt. The liquid metal mixture melt is cooled to an intermediate temperature between about 1000 C and about 1300 C over a first duration of time to initiate a solidification process. The liquid metal mixture melt is held at the intermediate temperature between about 1000 C and about 1300 C for a second duration of time. The liquid metal mixture melt is quenched to a temperature between about 400 C and about 600 C over a third duration of time. The first duration of time is between may be between 5 minutes and 100 minutes. The second duration of time may be between 0.5 seconds and 10.0 seconds The quenching limits the formation of carbide precipitates. The metal mixture is tempered at a temperature between about 450 C and about 600 C for a duration of time of between about 10 minutes and about 60 minutes. The metal mixture is cooled in the absence of active heating. The metal mixture includes ferritic stainless steel alloy. The ferritic stainless steel alloy may be corrosion resistant. The ferritic stainless steel alloy may have a body centered cubic crystal structure.

The furnace may include a cold sprayer. The method may further include atomizing the ferritic stainless steel alloy. The method may further include depositing the atomized ferritic stainless steel alloy as a coating on a steel component. The ferritic stainless steel alloy coating may be metallurgically bonded to the surface of the steel component. The ferritic stainless steel alloy coating on the steel component may resist corrosion of the steel component. The ferritic stainless steel alloy may be a bulk material.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
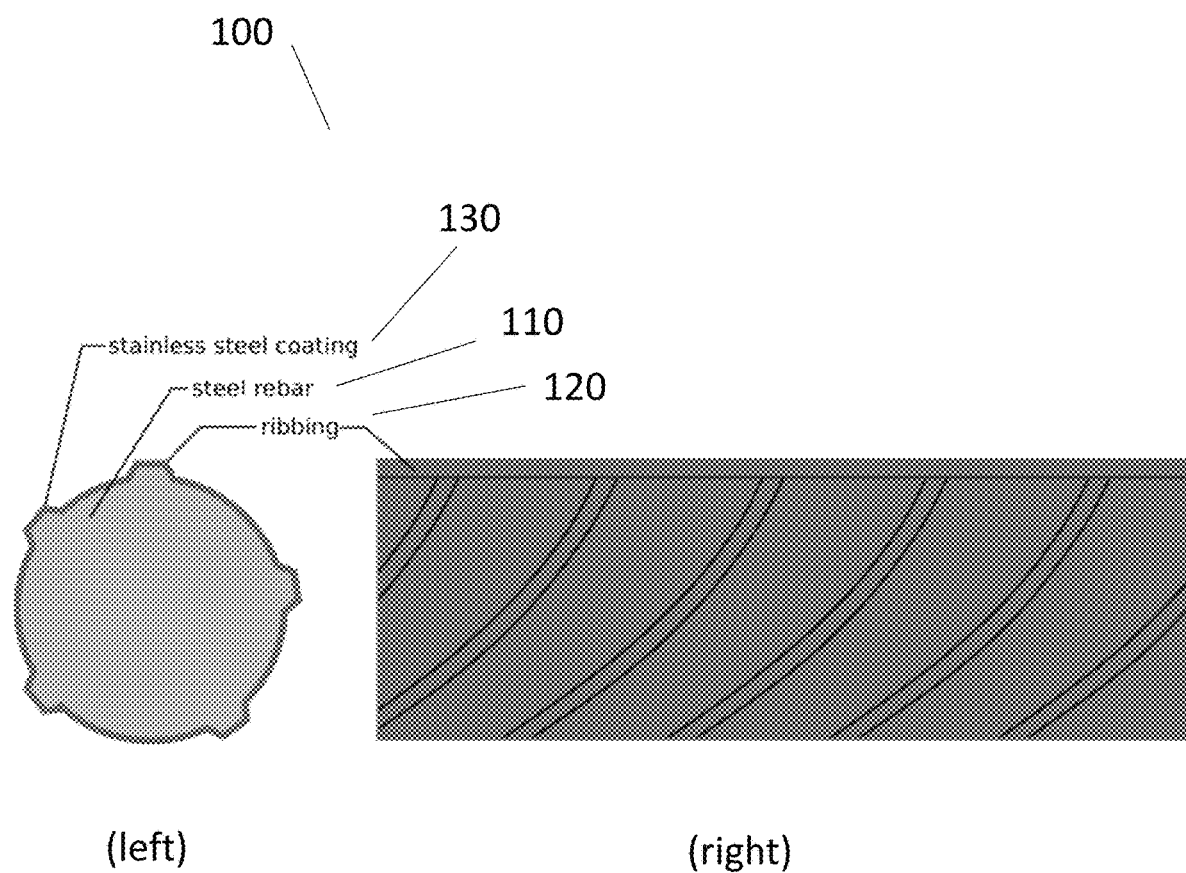
FIG. 1 schematically illustrates various embodiments of the present disclosure of steel rebar with a stainless steel coating in accordance with illustrative embodiments, FIG. 2 schematically illustrates various embodiments of the present disclosure of an interfacial region between a protective coating and concrete in accordance with illustrative embodiments, FIG. 3 schematically illustrates various embodiments of the present disclosure of an interfacial region between a protective coating and concrete in accordance with illustrative embodiments, FIG. 4 schematically illustrates various embodiments of the present disclosure of an interfacial region between a protective coating and concrete in accordance with illustrative embodiments, FIG. 5 schematically illustrates various embodiments of the present disclosure of an interfacial region between a protective coating and concrete in accordance with illustrative embodiments, FIG. 6 schematically illustrates a corrosion holiday and pitting corrosion, FIG. 7 schematically illustrates various embodiments of the present disclosure of a coating interface in the case of a cold spray application in accordance with illustrative embodiments, FIG. 8 schematically illustrates a poorly bonded and porous coating, FIG. 9 schematically illustrates various embodiments of the present disclosure of a cold spray deposition system in accordance with illustrative embodiments, FIG. 10A schematically illustrates various embodiments of the present disclosure of a cold spray deposition system in accordance with illustrative embodiments, FIG. 10B schematically illustrates various embodiments of the present disclosure of a cold spray deposition system in accordance with illustrative embodiments, FIG. 11 schematically illustrates various embodiments of the present disclosure of a nozzle design in accordance with illustrative embodiments, FIG. 12A schematically illustrates various embodiments of the present disclosure of nozzle arrays in accordance with illustrative embodiments, FIG. 12B schematically illustrates various embodiments of the present disclosure of nozzle arrays in accordance with illustrative embodiments, FIG. 13(left) schematically illustrates various embodiments of the present disclosure of nozzle arrays in accordance with illustrative embodiments, FIG. 13(right) schematically illustrates various embodiments of the present disclosure of nozzle arrays in accordance with illustrative embodiments, FIG. 14(left) schematically illustrates various embodiments of the present disclosure of nozzle arrays in accordance with illustrative embodiments, FIG. 14(right) schematically illustrates various embodiments of the present disclosure of nozzle arrays in accordance with illustrative embodiments, FIG. 15 schematically illustrates various embodiments of the present disclosure of nozzle arrays in accordance with illustrative embodiments, FIG. 16 schematically illustrates various embodiments of the present disclosure of nozzle arrays in accordance with illustrative embodiments, FIG. 17A schematically illustrates various embodiments of the present disclosure of an integration of spray systems into a manufacturing line in accordance with illustrative embodiments, FIG. 17B schematically illustrates various embodiments of the present disclosure of an integration of spray systems into a manufacturing line in accordance with illustrative embodiments, FIG. 18 schematically illustrates various embodiments of the present disclosure of a corrosion resistant stainless steel alloy in accordance with illustrative embodiments.

In illustrative embodiments, a coating is applied to steel reinforcement bar (e.g., steel rebar) that could considerably extend the lifetime of concrete structures by reducing steel rebar corrosion. The coating includes a thin, passivating steel (e.g., stainless steel) layer that is applied to the outside of conventional steel rebar. The coating can be applied in-line through metal cold spray manufacturing, which is a high throughput coating technique that can be integrated into existing steel manufacturing plants. The technology solves the challenge of rebar corrosion in the presence of water and chlorides (salt), which limits the service life of many concrete structures including bridges, roadways, and marine structures. The coated rebar has a longer lifetime and lower cost than conventional coatings like epoxy coating. The in-line coating application method that can be directly integrated directly into steel manufacturing plants.

In illustrative embodiments, a high performance ferritic steel with tailored resistance to corrosion from chlorides is described. The new ferritic steel is distinct from other commercial and experimental steels, and is better suited for coating low-cost steel structures like rebar. This new steel provides complete protection against corrosion in the presence of chlorides. The new ferritic steel coating is separate from conventional steels because it is formulated to perform as a thin coating designed to produce multiple protective oxide layers to give more extensive corrosion protection than existing stainless steels. Multiple alloying elements including Cr, Al, and Si will each form protective oxides independently, increasing the total amount of protection and extending it over much wider ranges of pH and electrical potential. High concentrations of Mo are included to reverse any pitting corrosion caused by chlorides by re-passivating newly formed pits. The resulting steel is more protective against corrosion, especially in high concentrations of chloride ions, than conventional stainless steels or galvanized steels. The novel, high performance ferritic steel can also be applied in-line through metal cold spray manufacturing to resist corrosion to the rebar.

It should be noted, however, that although steel reinforcement bar is discussed, various embodiments apply to other types of steel products, such as I-beams, rails, pipes, billets, tubes, and the like. Accordingly, discussion of steel reinforcement bar is for illustrative purposes and not intended to apply to all embodiments.

Corrosion Resistance

Corrosion of rebar occurs through at least two pathways. One pathway is oxidation of the surface of the steel that occurs through exposure to water. Another pathway is a pitting pathway where chloride ion attacks the surface of the steel in pits formed in the surface of the rebar. The corrosion caused by pitting is a result of chloride ion (e.g. $Cl^-$) corrosion is due to exposure to salts such as sodium chloride (e.g., NaCl). The chloride ion can get access to the surface iron on the steel The oxidation pathway can be blocked by the formation of oxide barriers on the surface of the steel that forms a passivating layer (e.g., passivation coating). Passivating layers of certain metal oxides, such as chromium oxide, $Cr_2O_3$ (e.g. chromia), silicon dioxide, $SiO_2$ (e.g. silica), and aluminum oxide $Al_2O_3$ (e.g. alumina) on the surface of steel can protect the steel against oxidative corrosion. The pitting corrosion specifically can be blocked by certain metal oxides, such as molybdenum oxide, $MoO_3$ that are resistant to chloride ion attack (e.g. corrosion).

For passivation layers to be effective at preventing corrosion, they must be strongly bonded to the steel surface, they must fully cover the surface, and they must be sufficiently thick to provide a robust coating. To produce a passivation layer, a metallic coating can be applied that will naturally produce the desired oxide layer. Strong bonding between the metallic coating and the underlying component can be achieved by a metallurgical bond (e.g. metallic bond). Certain techniques, such as cold spray and weld overlay are capable of applying a metal coating to the steel that is metallurgically bonded (e.g. metallically bonded). Furthermore, these techniques are also capable of depositing a coating over an entire surface of a steel component, such as rebar or a billet. In addition, these techniques (cold spray and weld overlay) are capable of applying a metal coating to the steel that is sufficiently thick to provide a robust corrosion resistance, often between 50 and 300 micrometers.

In embodiments, a metal coating, such as a stainless steel, is applied to a steel component, and the metal coating forms a native oxide coating that serves as the passivating layer. A native oxide coating is a layer of one or more metal oxides that is formed on the surface of the metal spontaneously in water or air due to the exothermic driving force of the formation of the metal oxide. The oxygen in the water or air oxidizes the surface atoms of the metal to form a thermodynamically stable oxide coating. This surface oxide forms whenever a bare metal atom is exposed by either being freshly deposited, or by the protected oxide layer being scratched, or otherwise penetrated.

An example of this process is the deposition of a chromium containing stainless steel on a steel component. In this example, the deposited stainless steel coating includes chromium metal, of which some is on the surface of the coating. Oxygen present in the water or air spontaneously forms a surface oxide of chromium (e.g., chromium oxide, $Cr_2O_3$), and it is the surface layer of the chromium oxide layer that is formed spontaneously in reaction with the oxygen in the water or air that provides the protection from oxidation and pitting corrosion.

This process of forming a surface oxide from atoms on the surface of the stainless steel occurs spontaneously. Furthermore, the thermodynamic strength of the bonding between the metal and the oxygen can result in a rearrangement of the surface atoms to form layers of a certain metal oxide. In the example above describing the formation of chromium oxide, the thermodynamic driving force of the formation of the $Cr_2O_3$ may cause the metal atoms at the surface of the stainless steel coating to rearrange (e.g., diffuse) to allow the formation of the chromia layer. That is, the meal atoms close to the surface of the alloy may diffuse from a location below the surface of the alloy to the surface under the thermodynamic potential of forming a native metal oxide on the surface of the alloy.

The thermodynamic driving force for the formation of an oxide of each atom that makes up a stainless steel coating can cause the metal oxide layers to separate and stack upon each other in a predictable order to form a multilayer structure spontaneously. The order of the stacking of the metal oxide layers in the multilayer is determined by free energy of formation (ΔG) for each of the metal oxides. The metal oxide with the largest ΔG (in absolute value) will tend to form closest to the steel component, with the metal oxide having the smallest absolute ΔG on the surface of the coating. That is, the metal atoms diffuse up from positions in the alloy structure up through the metal alloy to the surface to form each metal oxide layer, and the position of a particular metal oxide in the multilayer is determined by the ΔG of each metal oxide.

In some embodiments, the incorporation of certain metals as primary alloying metals, such as chromium and molybdenum, into stainless steel coatings with a base metal of iron may also provide structural advantages, as well as corrosion resistance. Herein, a variety of stainless steel coatings are disclosed with different elements as primary (e.g., chromium (Cr), molybdenum (Mo), nickel (Ni), and/or manganese (Mn), and the like) and secondary and tertiary alloying elements (e.g., aluminum (Al), silicon (Si), carbon (C), nitrogen (N), and/or sulfur (S), and the like) and with different compositions of the alloys. In some embodiments, the primary alloying elements may be primary oxide formers, while secondary alloying elements may be secondary oxide formers.

Bi-Metal Steel Composite

In order to impart robust corrosion resistance to a steel component (e.g., steel reinforcement bar (rebar)) at a low cost, illustrative embodiments utilize a thin outer coating of stainless steel onto conventional carbon steel rebar. This thin coating can passivate the steel rebar in the same manner as a pure stainless steel rebar, providing resistance to corrosion before and after consumption in concrete structures. This results in concrete structures that are more resilient to corrosion, and therefore have extended operational lifetimes.

FIG. 1 schematically illustrates steel rebar with a stainless steel coating 100. FIG. 1 (left) schematically illustrates a cross sectional view of a corrosion resistant stainless steel coated bar, and FIG. 1 (right) schematically illustrates a plan view of a portion of a surface corrosion resistant stainless steel coated bar. The steel rebar 110 has ribbing 120, and the rebar is illustrated with a stainless steel coating 130. The stainless steel coating 130 completely covers the steel rebar 110 including the ribbing 120. Complete coverage of the rebar 110 with its ribs 120 by the stainless steel coating 130 is necessary for comprehensive corrosion resistance.

In some embodiments, the use of a molybdenum-containing coating (e.g. outer layer) imparts resistance to chloride attack. This provides resistance to salt-containing environments, such as marine applications and locations that use de-icing salts. In some embodiments, the use of secondary oxide formers including aluminum and silicon bolsters the corrosion resistance across a wider range of environments.

Figure 2:
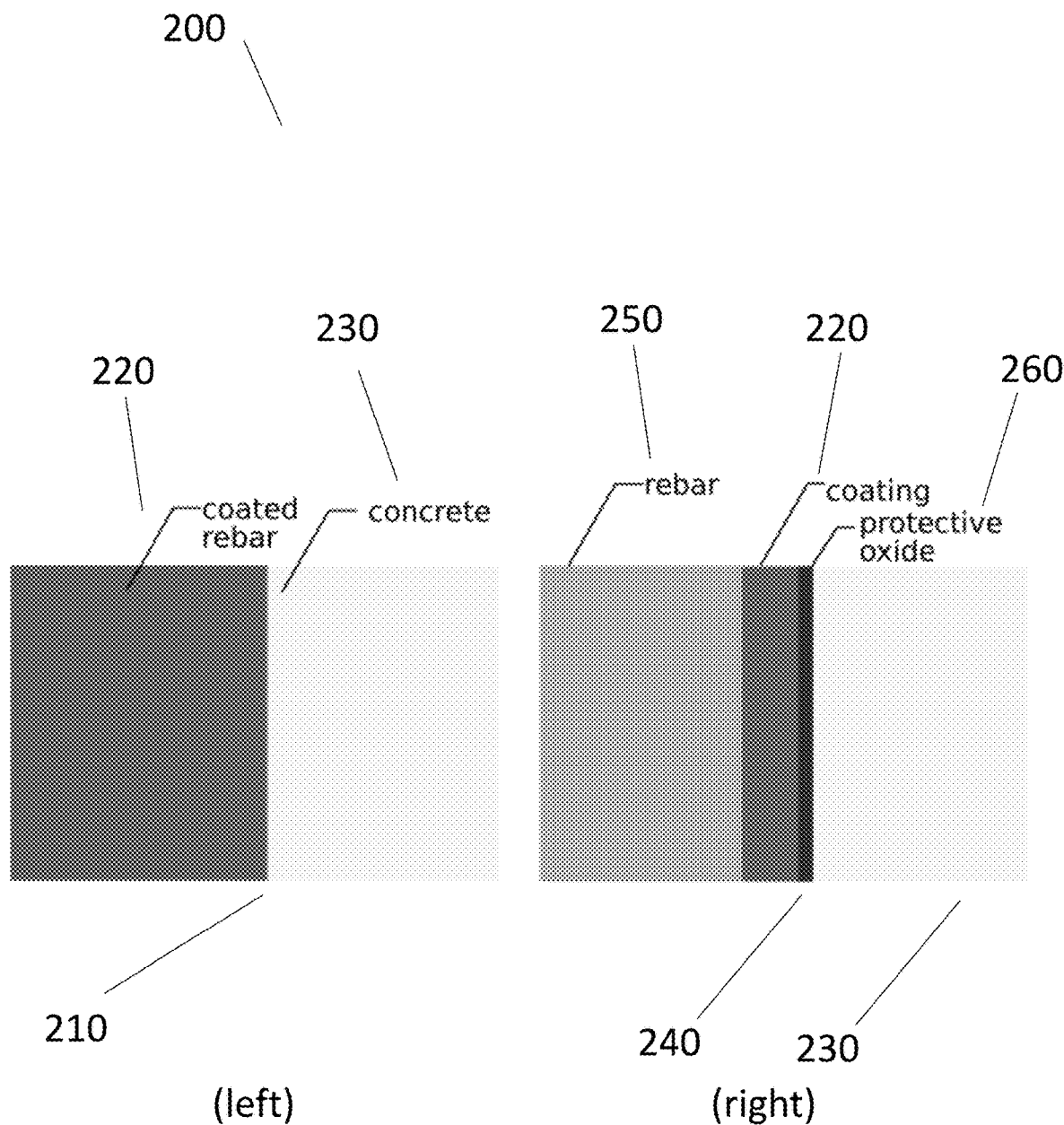

FIG. 2 schematically shows an embodiment of an interfacial region between a protective coating and concrete in accordance with illustrative embodiments. FIG. 2 (left) schematically illustrates the interface 210 between a coating 220 on a coated steel rebar and concrete 230. The interfacial region 210 is abrupt, indicating that formation of a passivation layer has not started. FIG. 2 (right) schematically illustrates the interface 240 between a coating 220 on a coated steel rebar 250 and concrete 230. A protective native oxide layer 260 (e.g., passivation layer) has grown on the surface of the coated rebar 220 as a result of the oxidizing components in the concrete. The protective oxide layer 260 provides resistance to corrosion of the underlying rebar 250. The outer oxide layer 260 contains passivating compounds (e.g., for example, $Cr_2O_3$ and $MoO_3$) that protect against corrosion, and prevent potentially corrosive species from coming into contact with the rebar. These compounds form native protective oxide layers outside of the coating at the interface between the coating 220 and the concrete 230, thereby preventing corrosion of the underlying carbon steel rebar.

Figure 3:
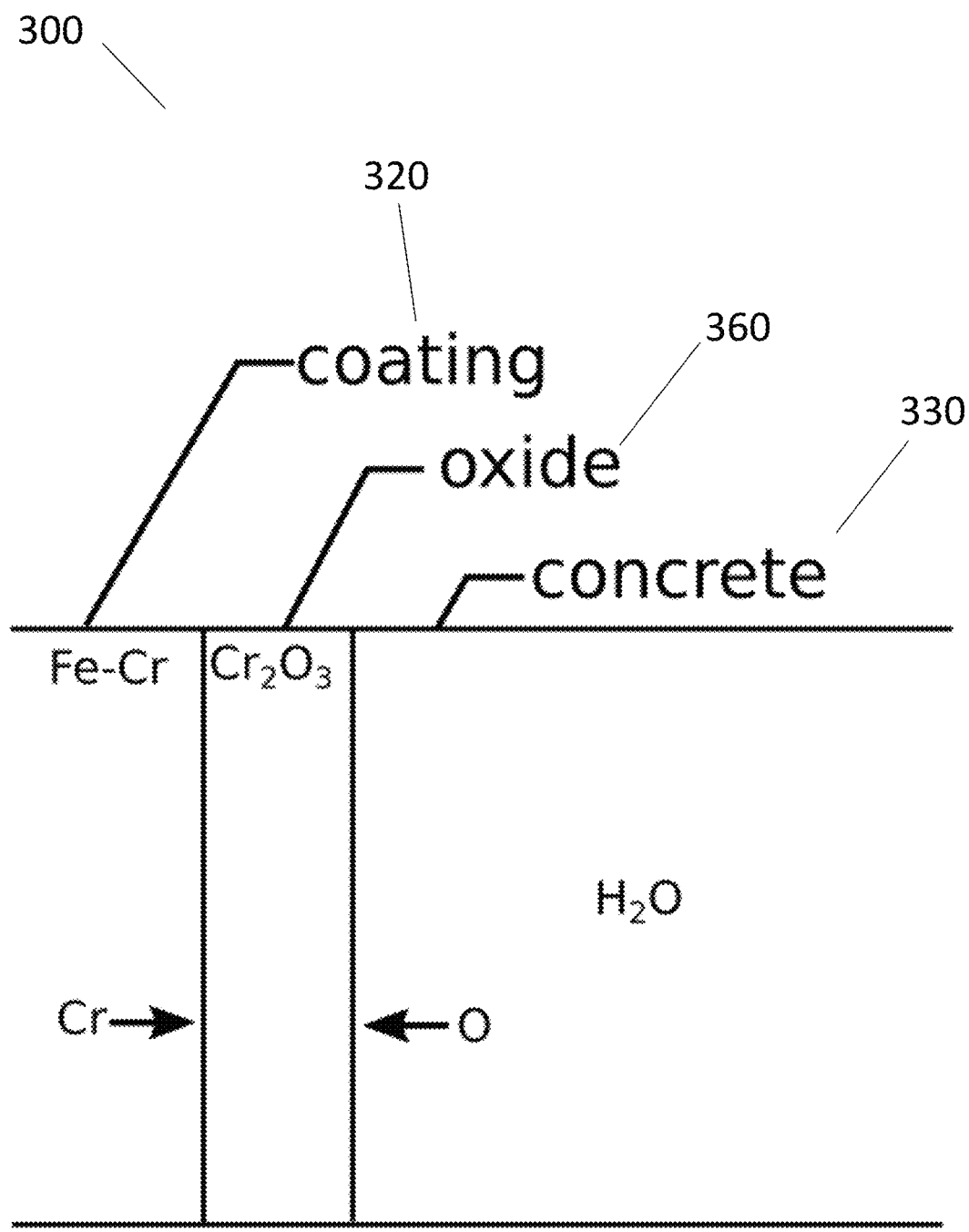

FIG. 3 schematically shows an embodiment of an interfacial region between a protective coating and concrete in accordance with illustrative embodiments. FIG. 3 schematically illustrates 300 a protective oxide layer 360 of $Cr_2O_3$ having formed on a Fe—Cr alloy. The native protective oxide layer 360 of $Cr_2O_3$ forms on the surface of the Fe—Cr alloy because of the thermodynamic force to form an oxide compound when oxidizing elements (e.g., oxygen) are in contact with metallic elements (e.g., chromium, molybdenum, and the like). The protective oxide layer 360 of $Cr_2O_3$ is a passivating layer that provides a barrier that limits the diffusion of oxygen from the concrete 330 to the metal surface of a steel component (e.g., rebar, steel billet, and the like). The passivating $Cr_2O_3$ layer thus limits the rate of corrosion. FIG. 3 schematically illustrates how chromium in the outer coating 320 forms a chromia ($Cr_2O_3$) 360 outer layer, preventing and/or substantially mitigating the corrosion of iron within the steel component core.

In some embodiments, secondary oxide formers, such as silicon and aluminum, can be added to stainless steel alloys to bolster the chromium oxide and/or molybdenum oxide layers with additional protective oxides. The function of these secondary oxide formers is schematically illustrated in FIG. 4.

Figure 4:
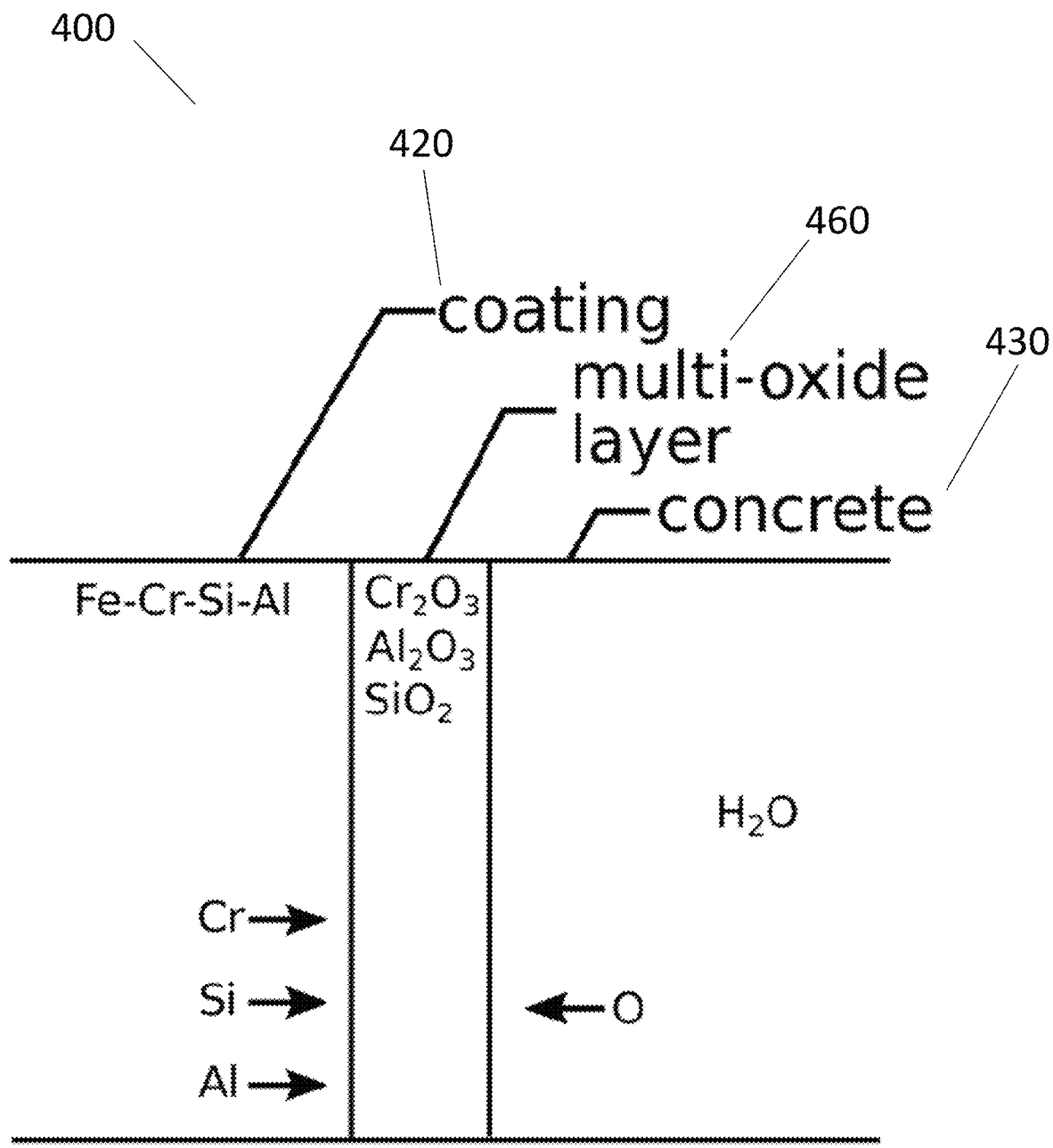

FIG. 4 schematically shows an embodiment of an interfacial region between a protective coating and concrete in accordance with illustrative embodiments. FIG. 4 schematically illustrates 400 a protective oxide 460 of $Cr_2O_3/Al_2O_3/SiO_2$ having formed on a Fe—Cr—Si—Al alloy. The protective oxide 460 of $Cr_2O_3/Al_2O_3/SiO_2$ forms a passivating multilayer (the multilayer structure is not shown in FIG. 4) that provides a barrier that limits the diffusion of oxygen from the concrete 430 to the iron core metal surface. The passivating $Cr_2O_3/Al_2O_3/SiO_2$ multilayer limits the rate of corrosion. FIG. 4 schematically illustrates how chromium, silicon, and aluminum in the outer coating 420 forms a $Cr_2O_3/Al_2O_3/SiO_2$ 360 multi-oxide layer barrier, preventing and/or substantially mitigating the corrosion of iron within the coating or rebar core.

In addition to oxygen in the air and concrete, chloride ions (e.g., $Cl^-$) present in many salts leads to corrosion of steel components. The chloride ions can form metal chlorides that corrodes steel components, as well as form metal oxychlorides with oxygen that is very effective at corroding and weakening structural steel, such as rebar.

Molybdenum oxide (e.g., $MoO_3$) is an effective barrier oxide to prevent chloride ions from corroding steel. Molybdenum metal forms a native oxide barrier layer, molybdenum oxide (e.g., $MoO_3$), on stainless steel alloys that contain molybdenum. In some embodiments, molybdenum in the coating can diffuse to pits in the coating and form molybdenum oxide. This $MoO_3$ re-passivates pits that form, preventing the growth of pitting type corrosion. This is particularly relevant in chloride environments, where pitting type corrosion can breach the protective oxide layer and compromise the underlying steel component (e.g., rebar). This re-passivation of pitting by molybdenum is depicted in FIG. 5-1.

Figure 5:
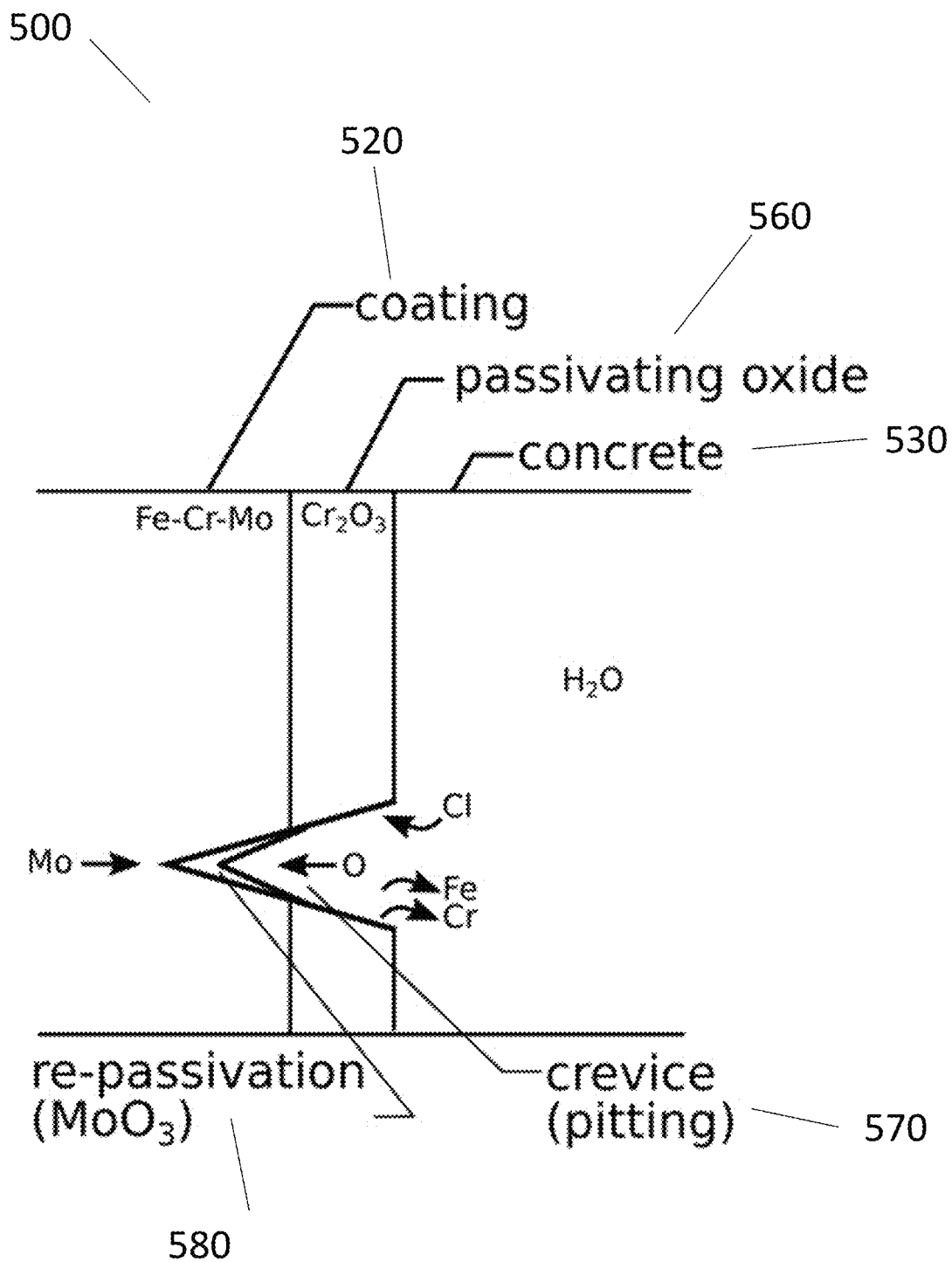

FIG. 5 schematically shows an embodiment of an interfacial region between a protective coating and concrete in accordance with illustrative embodiments. FIG. 5 schematically illustrates 500 a protective oxide layer 560 of $Cr_2O_3$ having formed on a Fe—Cr—Mo alloy. The native protective oxide layer 560 of $Cr_2O_3$ forms on the surface of the Fe—Cr—Mo alloy because of the thermodynamic force to form the chromium oxide compound when oxidizing elements (e.g., oxygen) are in contact with metallic elements (e.g., chromium). The protective oxide layer 560 of $Cr_2O_3$ is a passivating layer that provides a barrier that limits the diffusion of oxygen from the concrete 530 to the metal surface of a steel component (e.g., rebar, steel billet, and the like). The passivating $Cr_2O_3$ layer thus limits the rate of corrosion at least from oxygen.

FIG. 5 also schematically illustrates how oxide formation on the surface of the Fe—Cr—Mo alloy can reduce corrosion from pit/crevice formation in the alloy coating. A crevice/pit 570 may be formed through the oxide passivation coating $Cr_2O_3$ 560 and into the Fe—Cr—Mo alloy coating 520. As schematically illustrated, molybdenum oxide (e.g., $MoO_3$) in stainless steel alloy may form a re-passivation layer 580 that prevents and/or substantially reduces corrosion of the underlying steel component from the ion. That is, the presence of Mo in the stainless steel alloy provides a metal (Mo) that may diffuse to the surface of a pit/crevice to form an effective oxide layer of $MoO_3$ that may increase corrosion resistance in the presence of chloride ions.

Thus, while the formation of pits and/or crevices in a steel component may greatly increase the corrosion of the steel component, the application of a stainless steel barrier on the steel component, as disclosed herein in multiple embodiments, may significantly reduce, or even prevent corrosion of the steel component in the presence of pits/crevices. With successful metallurgical bonding, the stainless steel coating will remain attached to the bar through deformation of the bar, such as bending. A complete coating is expected to perform comparably to (or as well as) a bar made entirely of stainless steel, but with a substantially lower fraction of stainless steel (e.g., no more than 5%). With successful metallurgical bonding, the coating is expected to perform far better than modern epoxy-coated reinforcement bars due to the tough, robust nature and inherent corrosion-resistance of the stainless steel coating.

General Method of Fabrication

At least two general approaches to fabricate the coated steel components disclosed herein in illustrative embodiments include a spray deposition technique and a weld overlay deposition technique. In the first approach, a spray technique such as cold spray is used on a finished or nearly finished steel component, such as rebar. In the second approach, a weld overlay deposition technique is used to deposit a corrosion-resistant coating in a thickness that is larger than the thickness of the finished product. The following discussion of these two techniques are in no way limiting, and those skilled in the art may use other approaches to form the stainless steel coating disclosed herein. These two approaches are discussed for illustrative purposes only.

The first approach, using cold spray to deposit the coating onto the finished bar, is an excellent choice when the throughput required for manufacturing the component is high.

The second approach of using weld overlay, or some other coating deposition method/technique, followed by sequential rolling is a better choice when the quality of the coating is critical, but a lower throughput process is acceptable. Generally, the weld overlay process takes a much longer time to deposit the coating than cold spray.

When employing the first approach of cold spray deposition, the deposited particles are propelled at a high enough speed to achieve the adiabatic shear instability upon impact, which allows for plastic deformation to occur. This causes cold welding (e.g., metallurgical bonding) between the metallic coating and the underlying steel component.

When employing the second approach of weld overlay, special attention is paid to the heat-affected zone and potential carbide formation in the corrosion resistant coating. Carbide formation can potentially lead to cracking of the coating during the subsequent rolling process. Should carbide formation occur, heat treatment of the overlaid billet (e.g., at 1200 Celsius for 1 hour) can be employed. The heat treatment can be followed by several sequential rolling steps which reduce the total bar thickness as well as the coating thickness.

Coating Requirements

The corrosion-resistant metallic coating must completely cover the surface of the bar. If the coating is not complete, small openings or "holidays" can lead to a pitting corrosion attack. A pit (e.g., crevice) can lead to significant corrosion, particularly in the presence of chlorides (e.g., chloride ions, $Cl^-$). An example of this pitting process resulting from a coating holiday is shown in FIG. 6.

Figure 6:
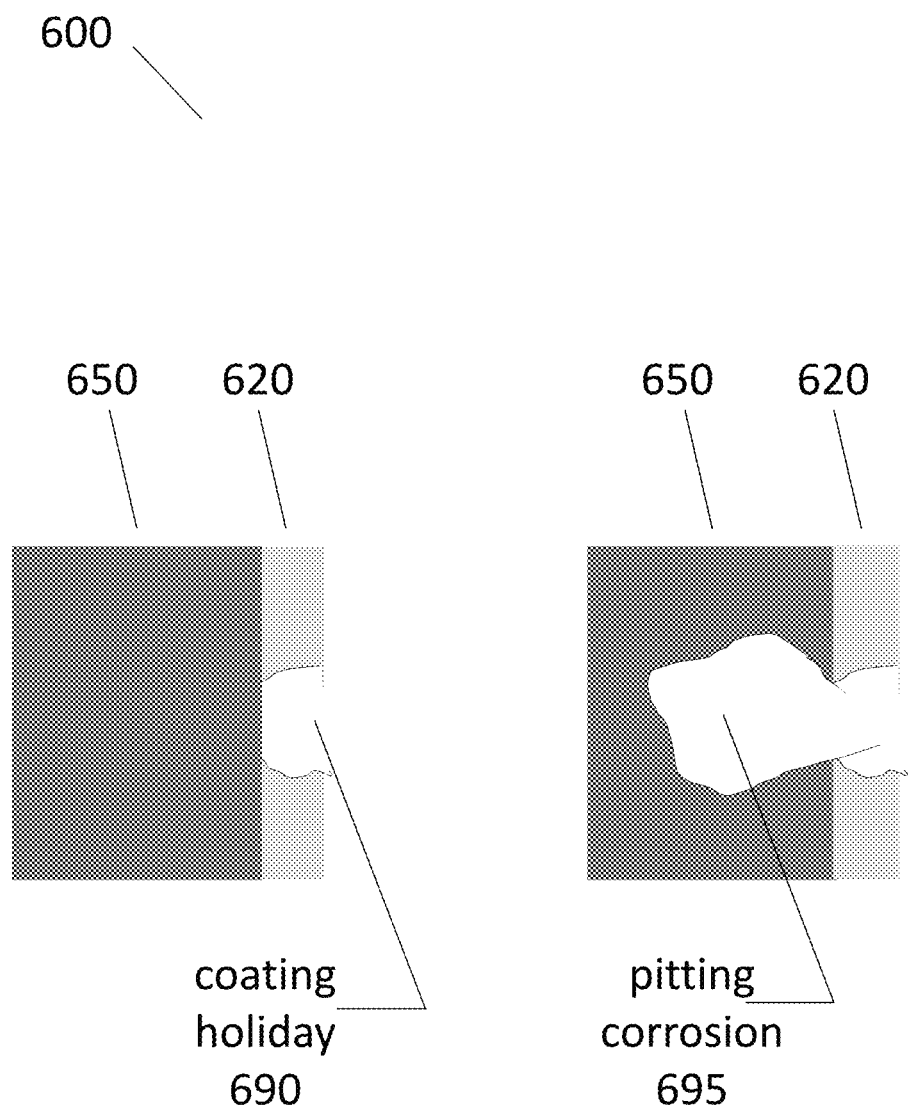

FIG. 6 schematically shows 600 a coating holiday, illustrating a potential for pitting corrosion from coating defects. In the event that a corrosion resistant stainless steel coating 620 on a steel component 650 has a coating holiday 690, it is possible for a pitting corrosion 695 to be initiated. Attacks to the structural integrity of the steel component by chloride ions and/or oxygen can proceed to create pitting corrosion 695. Such coating holidays may occur when the coverage of the coating is incomplete, and/or when the coating is poorly bonded or is porous.

Figure 7:
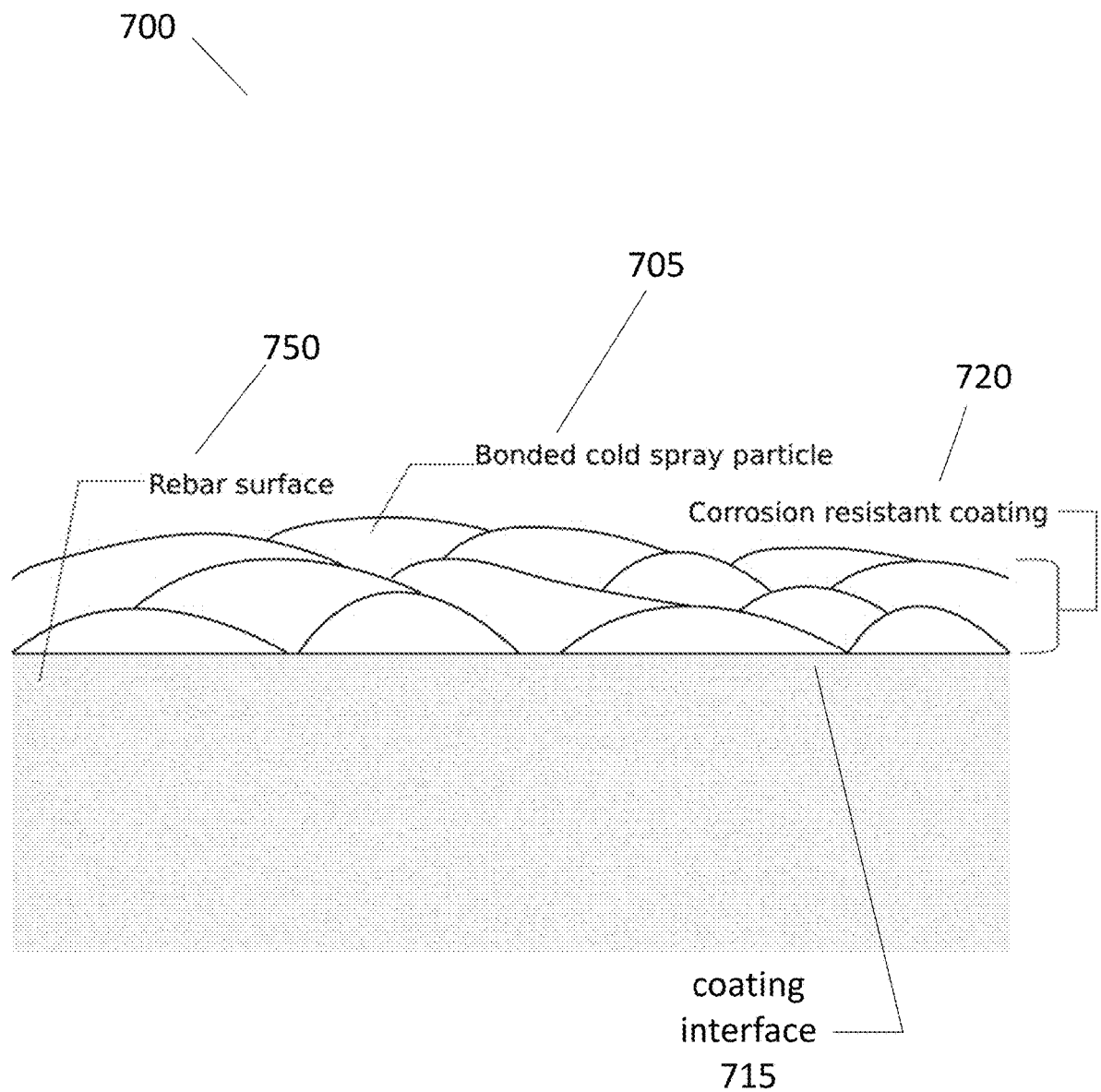

FIG. 7 schematically illustrates various embodiments of the present disclosure of a coating interface in the case of a cold spray application in accordance with illustrative embodiments. A schematic cross-sectional view 700 of the coating interface 715 for a cold spray application is shown. In cold spray deposition, a full contact surface interface 715 develops between the particles 705 and the surface of the substrate (e.g., steel component) 750. The coated particles 705 are flattened, and the flattening is indicative of plastic deformation and the cold welding of the impacted particle 705 to the substrate 750, which results in a well bonded coating 720.

In some embodiments, a mean particle size of the particles 705 may be between 5 microns and 20 microns. The corrosion resistant stainless steel coating 720 may have a mean thickness of between 10 microns and 100 microns. The corrosion resistant stainless steel coating 720 is fully adhered to the bar 750 with metallurgical bonding at the interface between the coating 720 and the underlying steel bar (e.g., component) 750.

Figure 8:
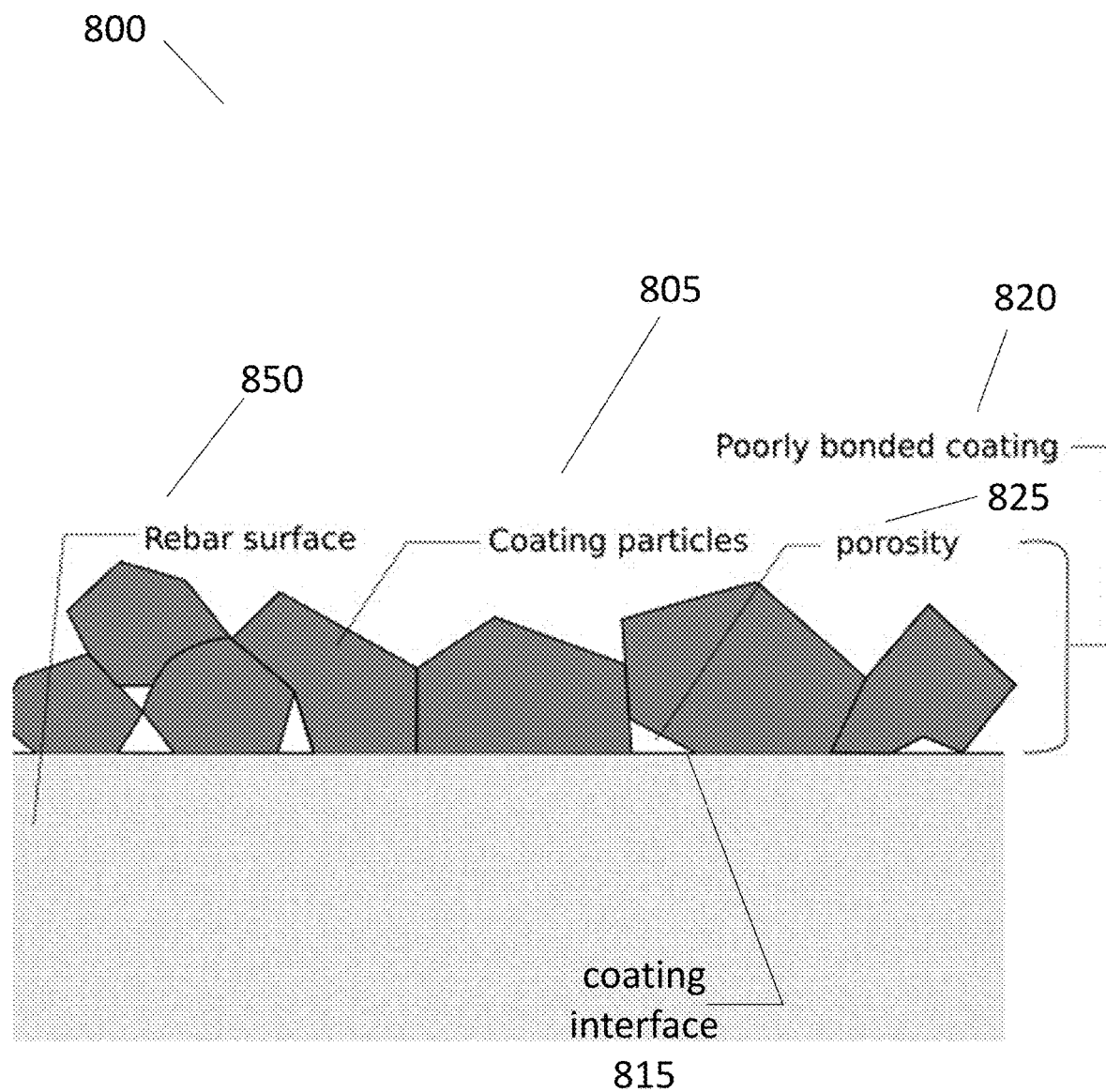

FIG. 8 schematically illustrates 800 a poorly bonded and porous coating 820. Poorly bonded, porous coatings 820 are undesirable and may lead to detachment of the coating 820 or penetration of the coating 820 by liquid in the corrosive environment. In unsuccessful bonding, the coating will not cover the surface 850 of the steel component, and/or will not adhere to the underlying substrate at the interface 815. There may be pores 825 which allow corrosive liquids and/or gases to penetrate the poorly bonded coating 820 and corrode the underlying steel component 850.

Coating Materials

In some embodiments, a range of coating metals can provide corrosion resistance. For example, ferritic stainless steels including grade 430 steel, iron-chromium-aluminum alloys, iron-chromium-molybdenum-aluminum alloys, iron-chromium-molybdenum-aluminum-silicon alloys, and the like, provide the effective corrosion resistance to steel components, as described herein. Furthermore, a ferrous alloy (e.g., with a minimum 14 wt % Cr) significantly improves the corrosion resistance of the reinforcement bar. In high-chloride environments, such as saltwater environments or roads, a chloride resistant coating alloy with a minimum 2 wt % Mo could be used to withstand chloride attack.

Further, new ferritic stainless steel alloys with a body centered cubic (e.g., BCC) structure are disclosed below. Other embodiments utilize Martensitic steels such as grade 4130 steel. Still, other embodiments utilize austenitic stainless steels such as grade 304 and grade 316 steel. Still, other embodiments utilize non-ferrous metals and alloys, such as aluminum, titanium, and chromium based metals. The above coating metals and those described in the examples below are for illustrative purposes only. Those skilled in the art may use other coating materials not listed here.

Cold Spraying System

Illustrative embodiments relate to a process for high throughput metal coating of metal components through continuous cold spray additive manufacturing. Illustrative embodiments also relate to components related to this process.

Many low cost steel structures suffer from reduced operational lifetimes due to the effects of corrosion on structural integrity. It can often be beneficial to apply a corrosion resistant outer layer to extend the performance lifetime. Existing methods including epoxy coating, painting, and galvanization provide limited resistance and large costs due to the inability to easily integrate into modern, high throughput methods of steel fabrication.

Cold spray additive manufacturing is a relatively high throughput method of applying a metal coating to the surface of a component. In cold spray, metal particles are sprayed out of a nozzle of the spray coater onto a substrate at high speeds and temperatures well below the metal melting point. These particles are accelerated to high speeds by a supersonic carrier gas before impacting the substrate. The coating particles then bond to the substrate upon impact, when their kinetic energy drives severe plastic deformation and cold welding. The coating particles form a metallurgical bond (e.g., metallic bond) with the substrate.

Figure 9:
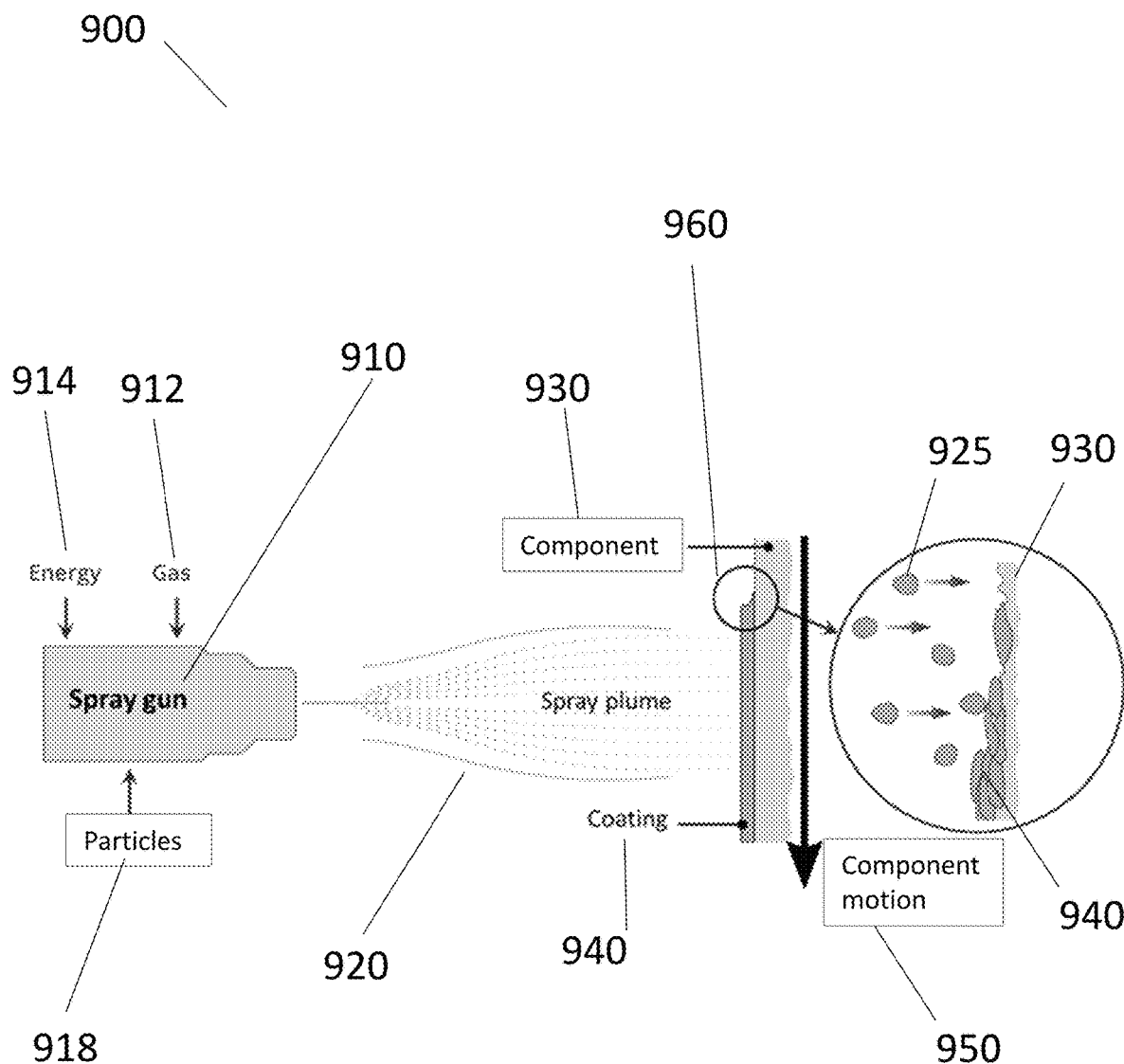

FIG. 9 schematically illustrates various embodiments of the present disclosure of a cold spray deposition system 900 in accordance with illustrative embodiments. In some embodiments, a cold spray deposition system 900 includes a spray gun 910. The spray gun 910 includes a gas input 912 that allows connection of a gas source to the spray gun 910. The gas may include at least one of nitrogen ($N_2$), helium (He), air, argon (Ar), xenon (Xe), or forming gas (5% $H_2$ in $N_2$). The gas may be at a high pressure between about 700 psi and about 800 psi. The gas may be heated by an energy source 914 to temperatures between about 900 C and about 1100 C.

The spray gun 910 includes a feeder input 918 for receiving a source of stainless steel particles from a particle feeder. The particle feeder may be a hopper for providing the stainless steel particles to the spray gun 910. The stainless steel particles may have a mean particle size of between 5 microns and 20 microns. The feeder feeds the stainless steel particles in a flow line that has the high-pressure gas that is a carrier gas for the particles.

The spray gun 910 includes an array of spray nozzles (not shown) that is configured to circumscribe a steel component so that there is an unobstructed line of sight between each region of the surface of the steel component and at least one of the nozzles in the array of nozzles.

The high-pressure, heated gas that is carrying the particles is fed into the array of nozzles. The array of spray nozzles is configured to accelerate the stainless steel particles by a force imparted by a high velocity of the heated gas exiting each of the nozzles in a plume of heated gas and stainless steel particles 920. The stainless steel particles impact the surface of the component 930 at the high velocity and metallurgically bond to the surface of the component 930 to form a stainless steel coating 940. In some embodiments the high velocity is a supersonic velocity.

The component 930 travels through the spray plume 920 with a component motion 950. The component motion 950 may be provided by a conveyor or some other mechanism to move the metal component 930 through the spray plume 920.

An expanded view 960 of an embodiment of the spray deposition system 900 shows particles 925 moving toward the component 930, as indicated by the arrows. The corrosion resistant coating 940 is shown being deposited on the component 930 as a buildup of particles 925 on the component. The particles 925 have a flattened appearance because they arrive at the component 930 at supersonic velocities. The flattened appearance is indicative of plastic deformation and the cold welding of the impacted particle 925 to the component (e.g., substrate) 930, which results in a well bonded coating 940.

Sprayer Components

Figure 10A:
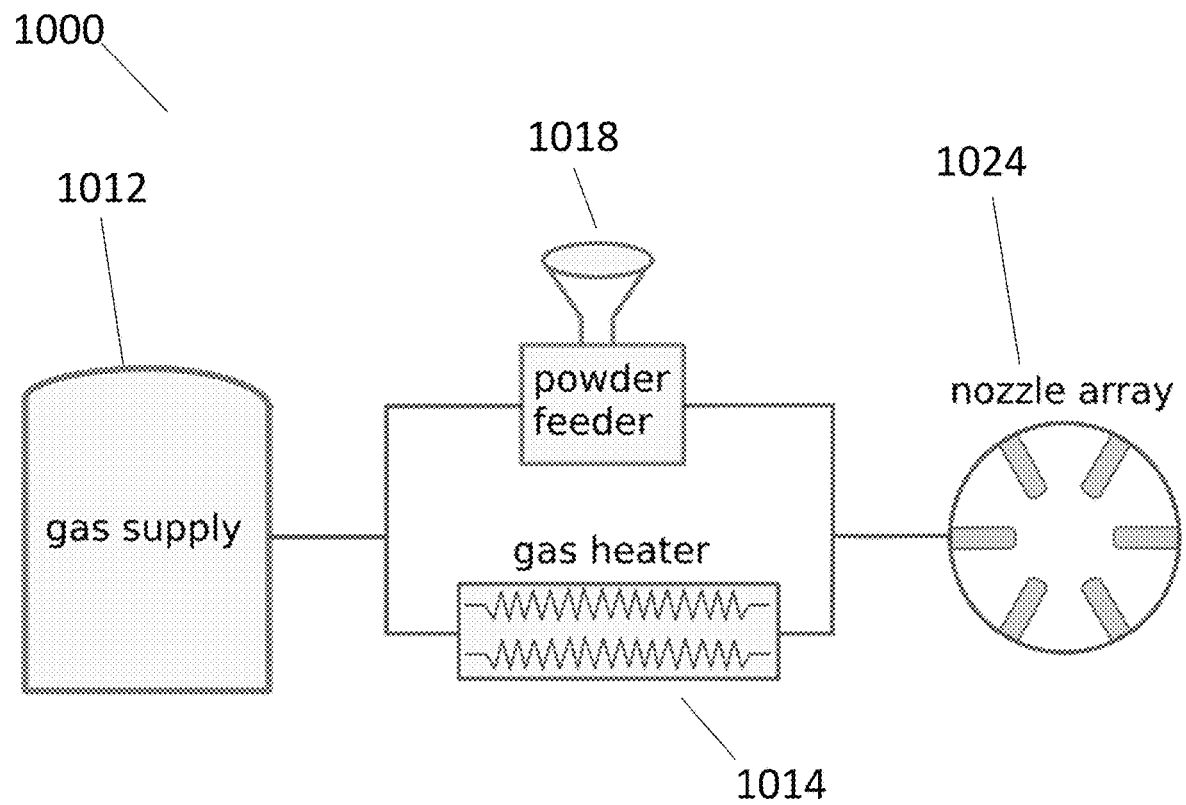
Figure 10B:
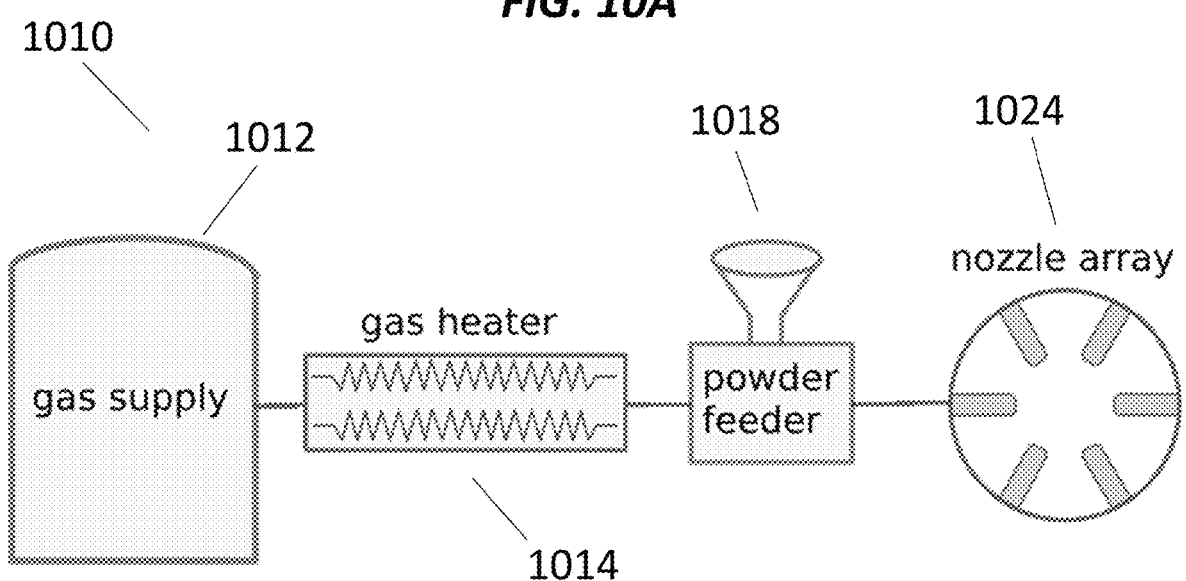

FIGS. 10A and 10B schematically illustrate various embodiments of the present disclosure of a cold spray deposition system in accordance with illustrative embodiments. As shown in FIGS. 10A and 10B, a spray system, 1000 and 1010, respectively, includes multiple components including a gas supply 1012, a particle (e.g. powder) feeder 1018, a gas heater 1014, and an array of spray nozzles 1024. The spray system 1000 of 10A is configured in a parallel arrangement. The spray system 1010 of 10B is configured in an in-line arrangement. In some embodiments, a spray system may utilize a parallel arrangement or an in-line arrangement. In some embodiments utilize only one each of said components. Other embodiments utilize multiple of one or more said components such as multiple arrays of nozzles connected to one system or multiple individual systems of gas heaters and nozzle arrays sharing one central gas supply.

Metal Particles

Illustrative embodiments utilize metal particles (e.g., powder) as a consumable input. These particles are fed into the carrier gas, where it is carried to the substrate at a high speed. The particles then impact the substrate (e.g., metal component), and form a metallurgical bond to the surface of the substrate, thus forming the coating. The particles can be fabricated through multiple methods including gas atomization, water atomization, and mechanical crushing.

In some embodiments, the applied particles are spherical particles fabricated through gas atomization. In some embodiments, the applied particles are near-spherical particles fabricated through high pressure water atomization. In some embodiments, the applied particles are irregular shaped particles fabricated through mechanical crushing.

In some embodiments, the particles have mean particle sizes in the range of 5-20 microns. In some embodiments, the applied coatings have a mean thickness in the range of 10-100 microns.

In some embodiments, the applied particles are a stainless steel such as a 300 series or 400 series steel to impart corrosion resistance to a steel component. In other embodiments, other corrosion resistant materials such as aluminum are used in the coating. In other embodiments, a sacrificial metal such as zinc is used to provide cathodic protection against corrosion.

In some embodiments, ceramic particles or other non-metal materials are incorporated into the metal coating to increase hardness or modify other surface properties.

Carrier Gas

Illustrative embodiments utilize a high pressure carrier gas to transport and apply kinetic energy to the coating particles. In some embodiments the carrier gas is supplied by a pressurized gas tank that is periodically filled or replaced. In some embodiments, the carrier gas is supplied by a gas compressor. In some embodiments, the pressure of the carrier gas may be between 500 pounds per square inch (e.g., psi) and 1000 psi, or the pressure may be between 600 psi and 900 psi, or the pressure may be between 700 psi and 800 psi, or the pressure may be about 725 psi.

The carrier gas (e.g., gas) may be preheated in a gas heater integrated into the cold sprayer. The carrier gas may also be heated prior to being provided into the cold sprayer. In some embodiments, the temperature of the gas may be between 700 C and 1300 C, or the temperature of the gas may be between 850 C and 1150 C, or the temperature of the gas may be between 900 C and 1100 C, or the temperature of the gas may be about 1000 C.

In some embodiments, a range of carrier gases may be used, including: nitrogen ($N_2$), helium (He), a mixture of nitrogen ($N_2$) and helium (He), air, and argon (Ar). In some embodiments, a reactive gas such as forming gas (e.g., 5% $H_2$ in $N_2$) may be used. Other embodiments will utilize other carrier gases or mixtures of gases.

Nozzles

Figure 11:
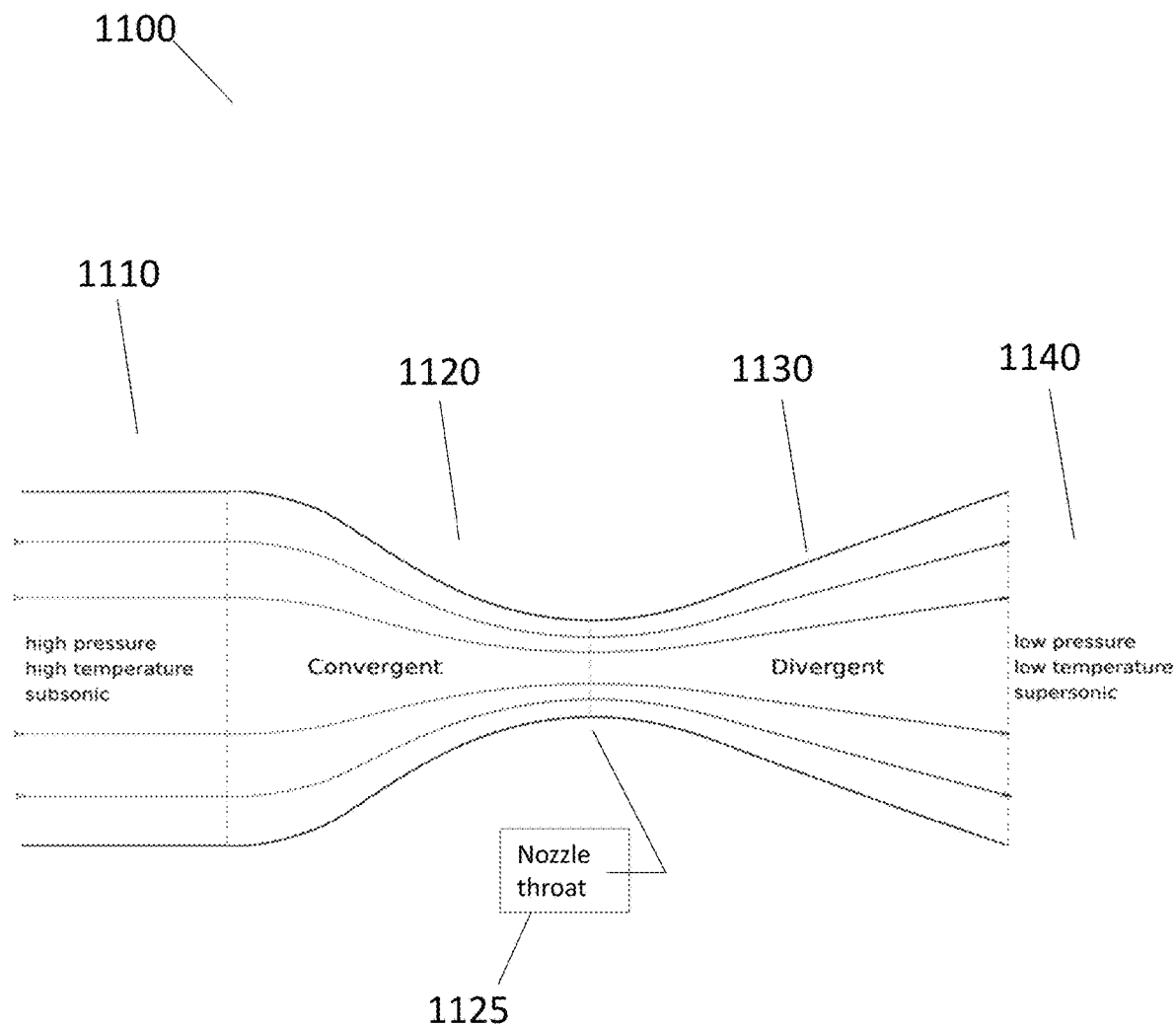

FIG. 11 schematically illustrates various embodiments of the present disclosure of a nozzle design in accordance with illustrative embodiments. In illustrative embodiments, a convergent-divergent nozzle design 1100 is utilized to accelerate the carrier gas and coating particles to supersonic velocities. A high pressure, high temperature carrier gas is mixed with the coating powder and fed into the nozzle 1110. As the gas and particles enter the nozzle, the gas is at high pressure, high temperature, and at subsonic velocities 1110. This gas is compressed through the converging section of the nozzle 1120, decreasing the pressure and temperature of the gas, but at the same time reaching the speed of sound at the throat of the nozzle 1125. The gas is then expanded through the diverging section of the nozzle 1130, where the pressure and temperature decrease further, and the gas velocity increases above the speed of sound. The coating particles are carried by the gas through both converging and diverging sections of the nozzle, and are accelerated through the force imparted by the high velocity of the gas. The carrier gas and powder exit the nozzle, forming a spray plume. That spray plume is directed onto the substrate, where the coating particles impact with high velocity and bond to the surface. In some embodiments, the convergent-divergent nozzle design is utilized in multiple such nozzles surrounding the component of interest to achieve a full coating.

Illustrative embodiments utilize an adaptation of the cold spray deposition process as a high throughput, low cost method for applying corrosion resistant coatings in a manner that is integrated into existing manufacturing processes for steel and other metals. In some embodiments disclosed herein, multiple, stationary convergent-divergent spray nozzles oriented in a way to fully coat the manufactured steel as it passes through an automated manufacturing line. Furthermore, other embodiments disclosed herein utilize multiple, movable convergent-divergent spray nozzles that move in a way to fully coat the manufactured steel as it passes through an automated manufacturing line.

It should be noted that although steel components are discussed, various embodiments apply to other metals, including aluminum, copper, and/or nickel based alloys. Furthermore, various embodiments apply to other geometries, including pipes, tubes, beams, and girders. While prevention of corrosion is discussed, various embodiments modify other surface properties including hardness, roughness, wear resistance, and visual appearance. Accordingly, discussion of steel bars and corrosion is for illustrative purposes and not intended to apply to all embodiments.

Some embodiments apply a corrosion resistant coating to existing steel and/or other metal products without significant adaptation of the manufacturing process. Such coatings impart corrosion resistance to the product, extending the shelf life and operational lifetime of the product and increasing the value of the product to its user.

Various embodiments may be incorporated into an existing metal manufacturing process at any step that enables line-of-sight access to the product. Some embodiments may apply a coating to a substrate across a full range of temperatures expected during the steel manufacturing process. The applied coating preferably does not significantly impact the shape or structural properties of the underlying metal.

Nozzle Arrays

Figure 12A:
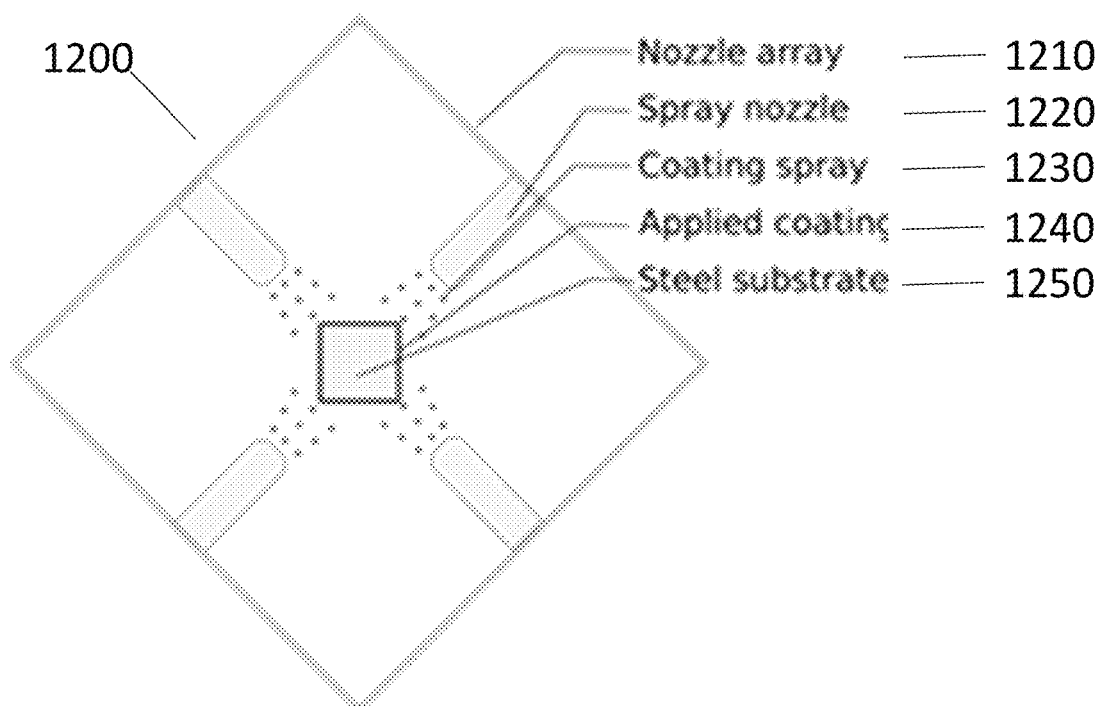
Figure 12B:
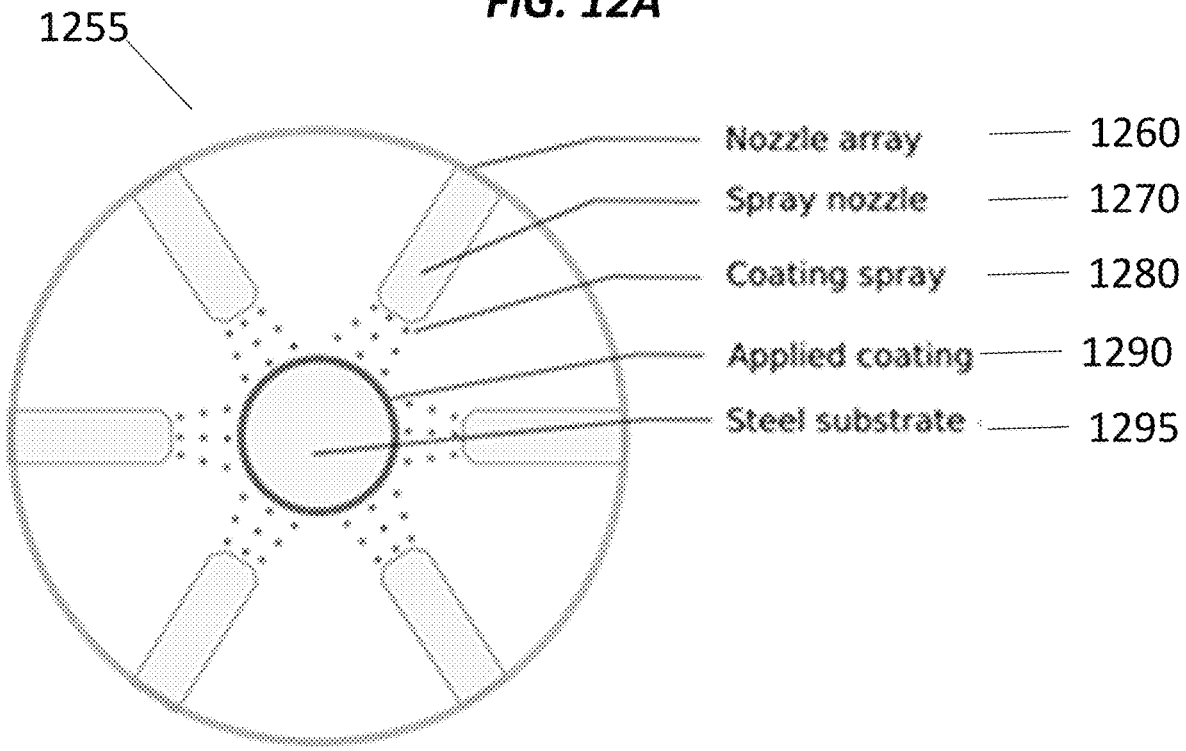

FIGS. 12A and 12B schematically illustrate various embodiments of the present disclosure of nozzle arrays in accordance with illustrative embodiments. FIG. 12A shows an embodiment 1200 of a rectangular nozzle array 1210 of cold spray nozzles 1220 that is oriented to coat the outside of a rectangular steel component 1250 (e.g., substrate), such as a steel billet. A coating spray 1230 is deposited on the rectangular steel component 1250 to form an applied coating 1240. The nozzles 1220 in the array of nozzles 1210 are configured to cover the entire surface of the rectangular steel component 1250. That is, the array of spray nozzles 1210 circumscribes the rectangular steel component 1250 in a rectilinear configuration to ensure there is an unobstructed line of sight between each region of the surface of the rectangular steel component 1250 and at least one of the nozzles 1220 in the array of spray nozzles 1210.

FIG. 12B shows an embodiment 1255 of a circular nozzle array 1260 of cold spray nozzles 1270 that is oriented to coat the outside of a circular steel component 1250 (e.g., substrate), such as rebar. A coating spray 1280 is deposited on the circular steel component 1295 to form an applied coating 1290. The nozzles 1270 in the array of nozzles 1260 are configured to cover the entire surface of the circular steel component 1295. That is, the array of spray nozzles 1270 circumscribes the circular steel component 1250 in a circular configuration to ensure there is an unobstructed line of sight between each region of the surface of the circular steel component 1295 and at least one of the nozzles 1260 in the array of spray nozzles 1270. In other embodiments, a complex array of nozzles are used to coat complex shapes including girders and beams.

Nozzle Placement

In illustrative embodiments, the nozzles in a nozzle array are oriented to ensure full coverage of the coated product. In some embodiments, nozzles are oriented such that the spray tracks of each nozzle overlap with neighboring spray tracks to ensure no gaps in coverage exist. In some embodiments, some of the spray nozzles may be oriented at least partially in a longitudinal direction and at least partially in a radial direction. This may enable the array of nozzles to cover portions of the components that might not be covered with an array of spray nozzles that are positioned only in a single plane. That is, at least some spray nozzles in an array of spray nozzles may produce a stream of particles at least partially in a longitudinal direction and at least partially in a radial direction. One or more nozzles may also point off of a radial line that is projected through the component. The direction of the off-radial line may be a tilt off of a plane formed by a collection of radial lines.

Figure 13:
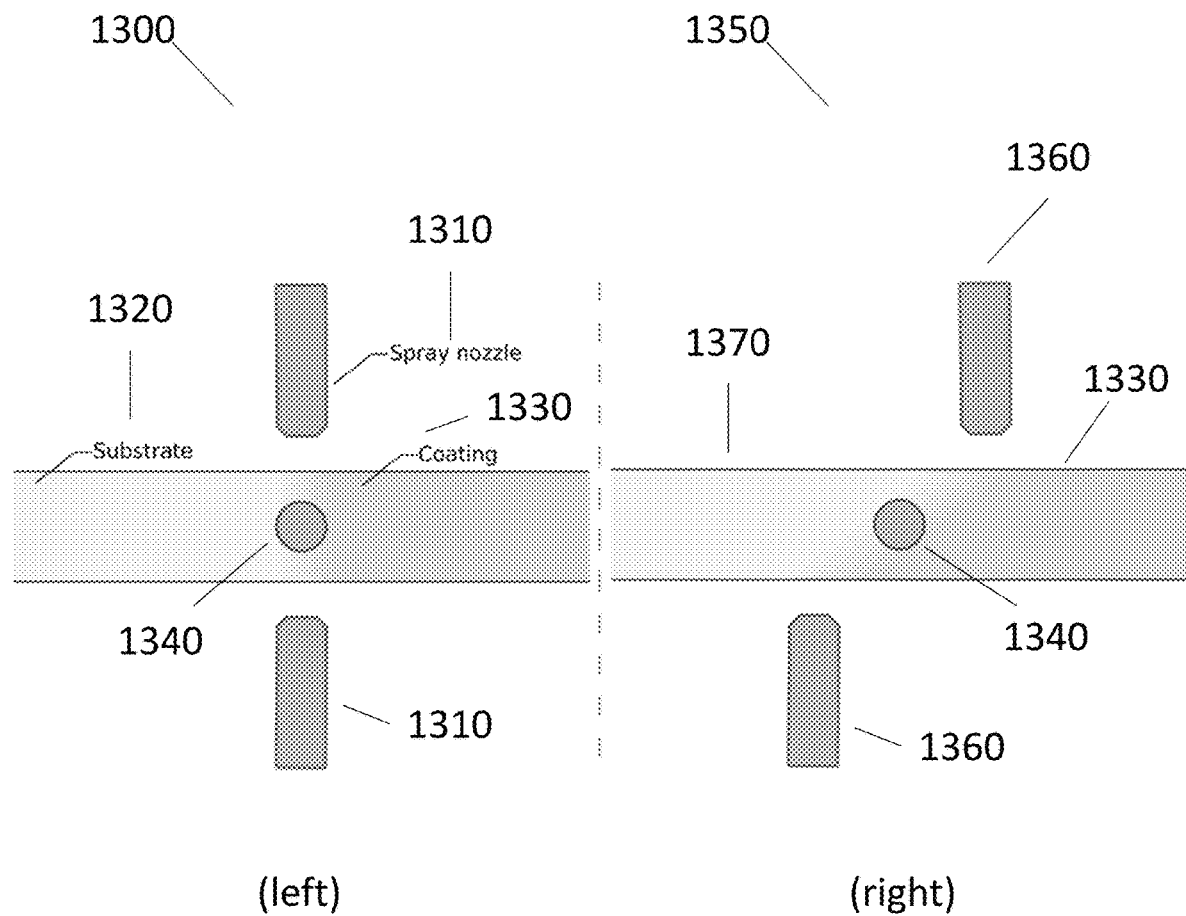

FIG. 13 schematically illustrates various embodiments of the present disclosure of nozzle arrays in accordance with illustrative embodiments. FIG. 13 (left) provides an illustrative example of embodiments of a nozzle array having a flat circumscribed array 1300 having the spray nozzles 1310 in a single plane. A substrate (e.g., metal component) 1320 is coated with coating 1330.

FIG. 13 (right) provides an illustrative example of embodiments of a nozzle array having a flat staggered array 1350 of coating nozzles 1360. In this embodiment, the array 1350 has the spray nozzles 1360 in a spiral array. A substrate (e.g., metal component) 1370 is coated with coating 1330.

In some embodiments involving coating of products with raised or sunken features will rotate nozzles relative to the surface in order to achieve full coverage. In one such embodiment, coating of steel rebar requires coating of ridges on the surface of the rebar.

Figure 14:
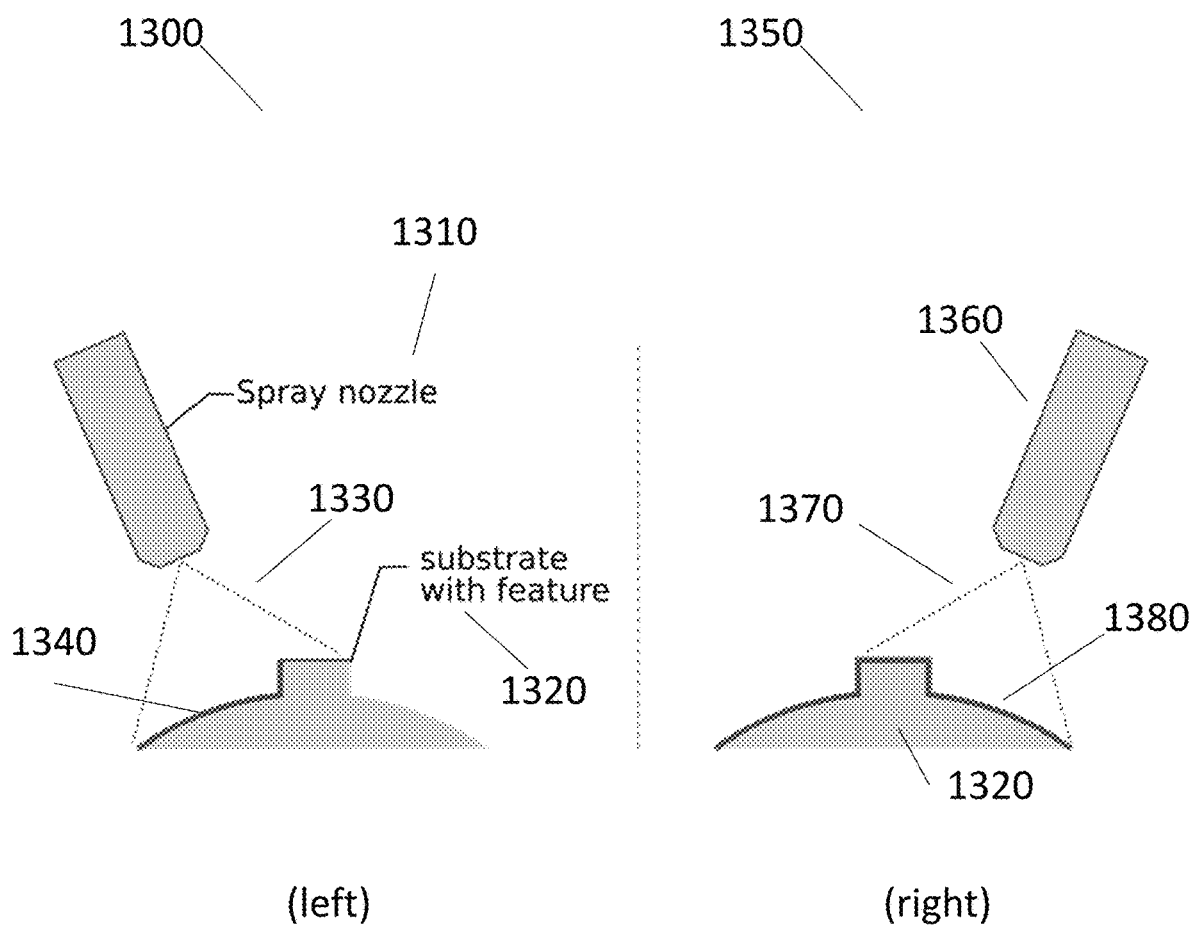

FIG. 14 schematically illustrates various embodiments of the present disclosure of nozzle arrays in accordance with illustrative embodiments. FIG. 14(left) illustrates an embodiment where nozzles 1310 are configured to spray 1330 particles to cover ridges 1320 on the surface of rebar. In FIG. 14(left) a nozzle 1310 is located to one side of the ridge and directed towards the ridge, to ensure that the coating 1340 covers the sides of the ridges.

FIG. 14(right) illustrates an embodiment 1350 where nozzles 1360 are configured to cover ridges 1320 on the other side surface of rebar (relative to FIG. 14(left)). In FIG. 14(right) a nozzle 1360 is located to the other side of the ridge 1320 (relative to FIG. 14(left)) and directed towards the ridge and the surface, to ensure that the coating 1380 covers the sides of the ridges, as well as the surface.

Figure 15:
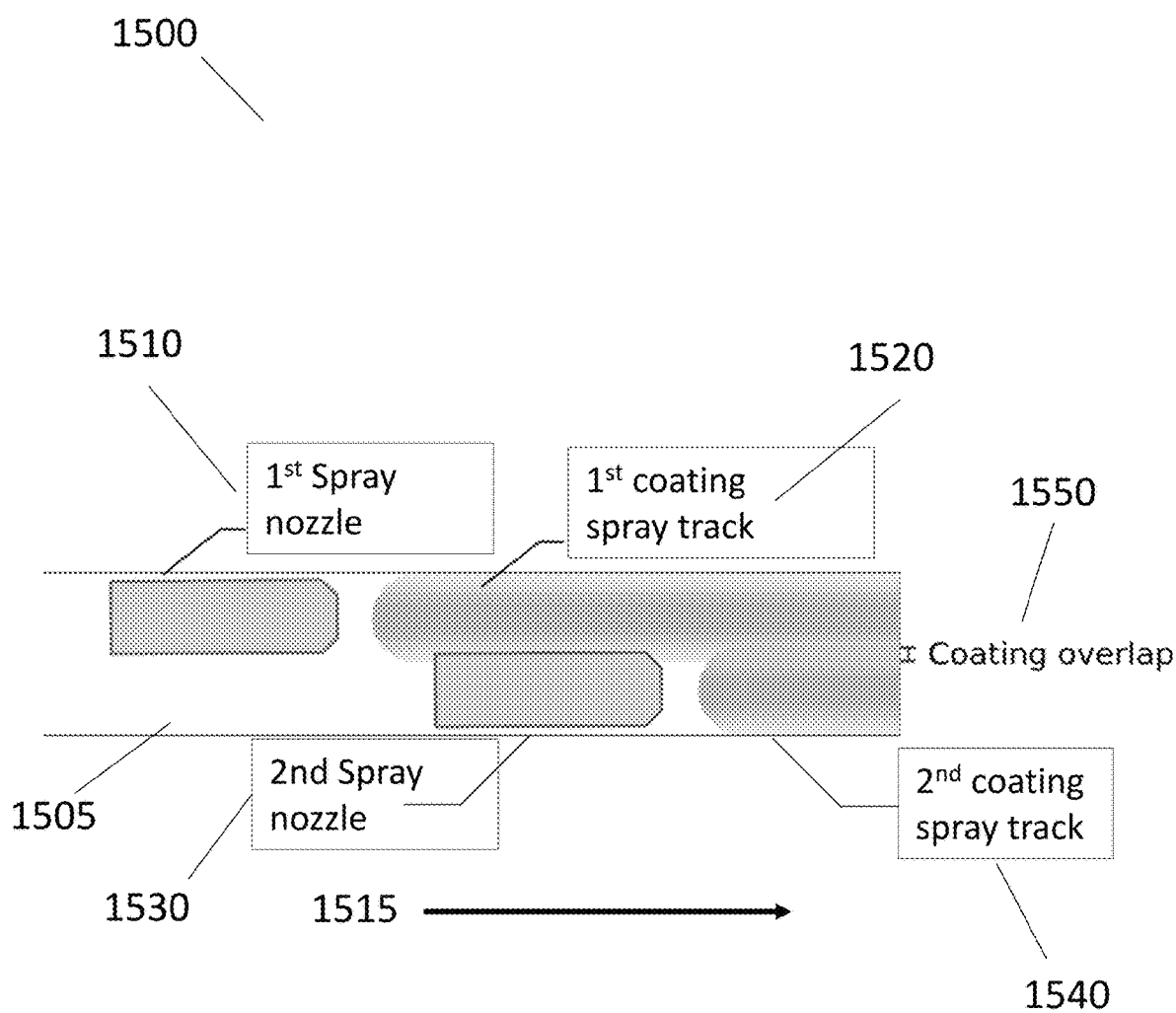

FIG. 15 schematically shows an illustrative embodiment where a later spray nozzle is oriented to overlap with the coating track from a previous nozzle. First spray nozzle 1510 sprays a first coating spray track 1520 on component 1505 that is traveling in direction 1515 relative to the first spray nozzle 1510. Second spray nozzle 1530 sprays a second coating spray track 1540. A coating overlap 1550 is produced by the overlapping spray nozzles 1510 and 1540.

Figure 16:
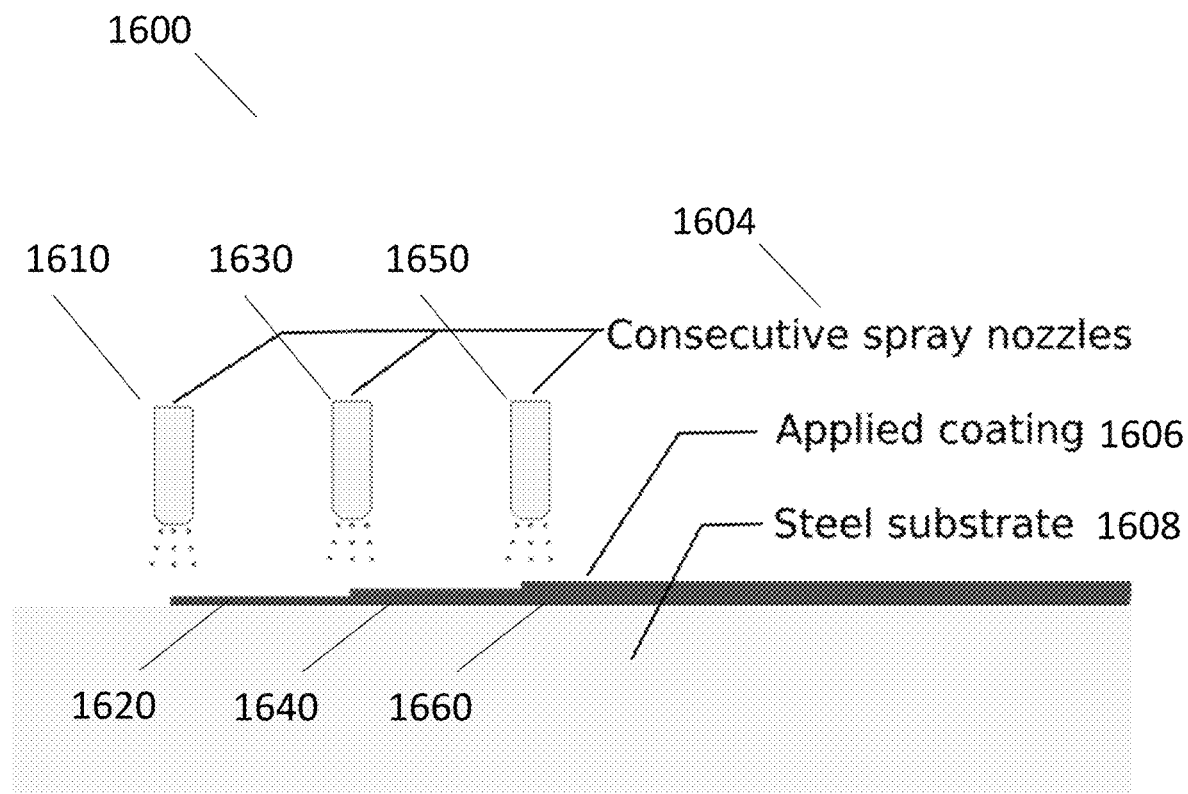

FIG. 16 schematically shows an illustrative embodiment 1600 where consecutive arrays of spray nozzles 1604 are configured to reach a desired coating thickness. In such embodiments, each array contributes a portion of the coating thickness, and each subsequent array builds on the thickness of the previous array. As schematically shown in FIG. 16, the first array 1610 sprays on first coating 1620 on steel substrate 1608 (e.g., steel component). The second array 1630 sprays on second coating 1640, and the third array 1650 sprays on third coating 1660. In this way, applied coating 1606 may attain the required thickness.

In some embodiments, arrays of spray nozzles are identical and interchangeable. In other embodiments, the arrays are located and directed differently to minimize local variations in the coating thickness. In some embodiments, a number of arrays are assembled in series in order to achieve the required coating thickness. In some embodiments, nozzles are oriented to cover the full circumference of the bar, including coverage of any ridges or other geometric features.

Integration of the Coating System

In illustrative embodiments, a spray coating system may be integrated into conventional metal manufacturing processes at many potential steps where line of sight access is possible. In some embodiments, coating will be performed near the end of the manufacturing process, once the product has been processed into its final shape. In other embodiments, the coating step could occur prior to or in between rolling steps, with the coating product bond maintained through the rolling process. In other embodiments, the coating could occur prior to heating. In other embodiments, coating could occur after cutting of the product.

Figure 17A:
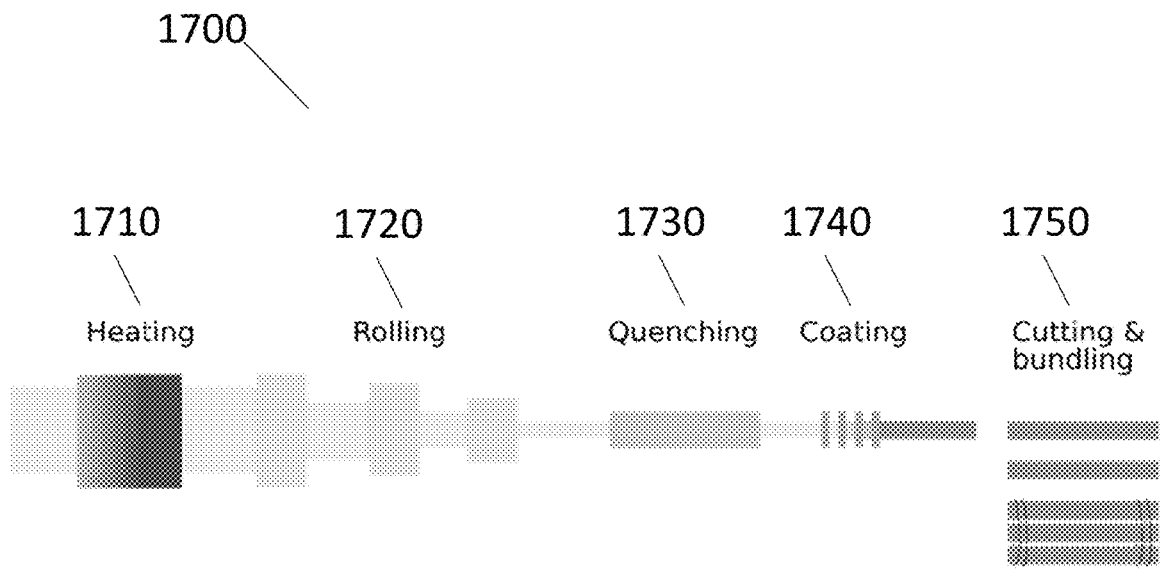

FIG. 17A schematically illustrates various embodiments of integration of spray systems into a manufacturing line in accordance with illustrative embodiments. FIG. 17A schematically shows a coating system installed into a steel bar manufacturing process 1700. In this embodiment, the coating system is located after the majority of the processing steps. Briefly, the manufacturing steps of heating 1710, rolling 1720, and quenching 1730 of the bar occur before the coating is applied 1740. In coating 1740, the coating system then applies a stainless steel coating in this embodiment through several stages of circular arrays. After the coating 1740, the coated steel bar is cut to length, allowed to cool, and bundled for distribution.

Figure 17B:
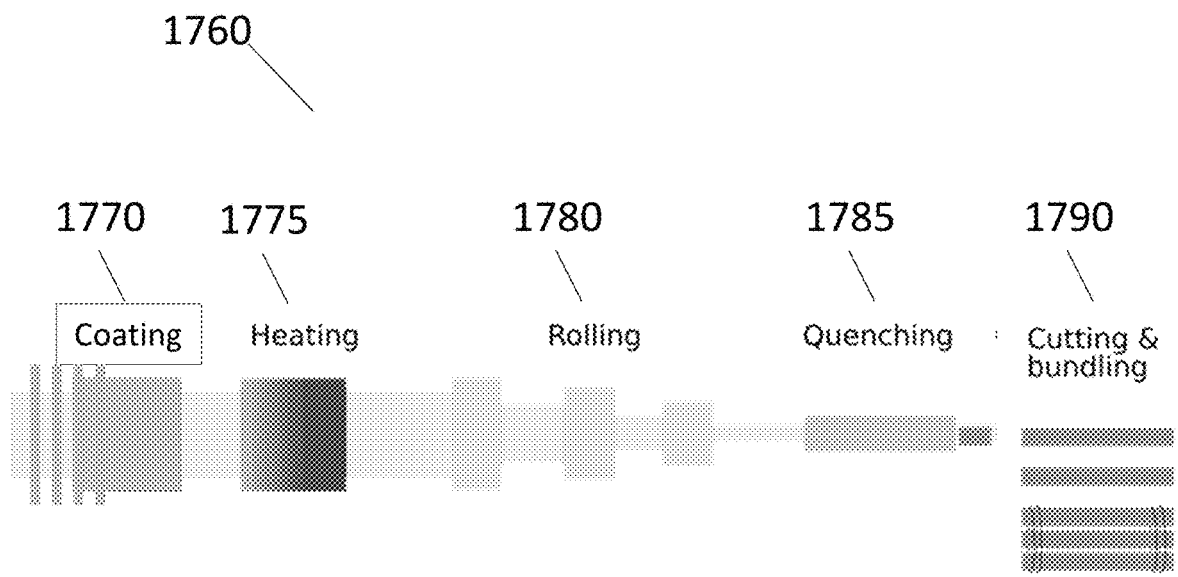

FIG. 17B schematically shows a coating system installed into a steel bar manufacturing process 1700. In this embodiment, the coating system is located before the majority of the processing steps. Briefly, the coating 1770 is performed on a steel billet prior to the steel manufacturing steps. In this embodiment, the coating system applies a stainless steel coating through several stages of circular arrays. Following the coating of the billet with the stainless steel coating, the coated billet goes through the processing steps of heating 1775, rolling 1780, and quenching 1785 of the bar. After quenching, the coated steel bar is cut to length, allowed to cool, and bundled for distribution.

Other embodiments include integration into manufacturing processes with other processing steps including casting, extruding, and drawing. Coating systems can be integrated prior to or after such processing steps.

Some illustrative embodiments integrate coatings into stages where the product has a minimal amount of oxide scale to limit contamination of the applied coating. Examples of such locations include immediately after high pressure water quenching and immediately after a rolling, drawing, and other deformation processes. In other embodiments, an additional processing step is used to strip the product of any oxide scale prior to coating.

Sizing and Orientation of the Coating System

The size of illustrative embodiments, including the number of nozzles and coating throughput, varies and is dependent on the details of the existing manufacturing process.

In some embodiments, the minimum coating thickness is determined by the requirements of the application. For instance, some applications will have a known maximum corrosion rate, requiring a particular coating thickness to ensure the component is protected for its full service life. Other applications will have requirements for the mechanical durability of the coating, including wear or scratch resistance that require a coating of a specific thickness to be met. In other embodiments, the minimum coating thickness will be determined by the need to reach full coverage of the component. In said embodiments, the coating thickness would be at least two to four times the mean diameter of the coating powder in order to enable full coverage.

A required coating throughput of embodiments can be determined by the desired coating thickness, the throughput of the existing manufacturing process, and the surface area of the product to be coated. The required throughput can then determine a minimum nozzle number, based on the maximum coating deposition rate of each nozzle. The coating system can then be sized to ensure it both meets the minimum nozzle number and can fully cover the surface of the coated component given the coating area of each nozzle.

Cold Spraying Large Steel Billet

A large billet of steel (approximately 7 in×7 in×25 ft) can be coated, rolled, and processed so that the delivered rebar already has a coating on it. In some embodiments, a process similar to that described above for FIG. 17B can be used to coat a large billet prior to the billet being processed into steel bars. By applying the stainless steel coating to a large billet prior to the heating, rolling, and quenching steps, as described for FIG. 17B, the costs of manufacturing of pre-coated rebar may be lower, and the throughput may be higher than coating the rebar after the heating, rolling, and quenching steps, as illustrated in FIG. 17A.

The surprising results of preparing a coating of a corrosion resistant ferrite stainless steel matrix on a steel component, indicates that using an array of spray nozzles in a cold spray process can be used to make corrosion resistant steel components.

New Steel Alloy Composition (Fe—Cr—Si—Al—Mo Alloys) (3)

Atmospheric and aqueous corrosion of steel is a major challenge to the engineering of effective and durable structures. Modifying the composition of steel to limit corrosion can reduce maintenance cost and enhance performance, as is the case with stainless steels. Corrosion resistance in steels is typically achieved by adding 14-20 wt. % chromium in order to form a surface layer of $Cr_2O_3$ (chromia) which protects the steel from corrosion. But, the chromia layer is susceptible to attack in a wide variety of settings including different corrosive environments, acidity (pH), and temperature. In particular, attack by halides including chloride ions (e.g., $Cl^-$) and fluoride ions (e.g., $F^-$) can remove the protective oxide layers and cause aggressive pitting-type corrosion.

In order to allow general corrosion resistance and halide resistance in a ferritic steel, illustrative embodiments use high concentrations of molybdenum (e.g., Mo) alongside passivating oxide formers such as chromium, aluminum, and silicon. Ferritic steels typically have a body centered cubic (e.g., BCC) structure. These high concentrations of molybdenum typically rapidly re-passivate regions where the oxide layer is damaged by halide attack. This results in a corrosion resistant stainless steel that has far greater resistance to halide attack than existing ferritic steels. Furthermore, 316 Stainless steel includes 2 wt % Mo to provide corrosion resistance in chloride environments.

In some embodiments, silicon and aluminum are incorporated as secondary and tertiary oxide formers, enabling further corrosion resistance in a broader range of environments. The presence of austenite stabilizing elements such as nickel and manganese are limited to preserve the ferritic phase. Alloys such as Fe—Cr—Si and Fe—Cr—Al utilize the concept of a secondary protective oxide layer.

In illustrative embodiments, ferritic stainless steels can be utilized as a corrosion resistant coating to other compositions of matter including carbon steels. This outer coating could be applied by a variety of application methods including cold spray, weld overlay, and co-extrusion.

Application of Fe—Cr—Mo—Al—Si Alloys for Corrosion Resistance

Figure 18:
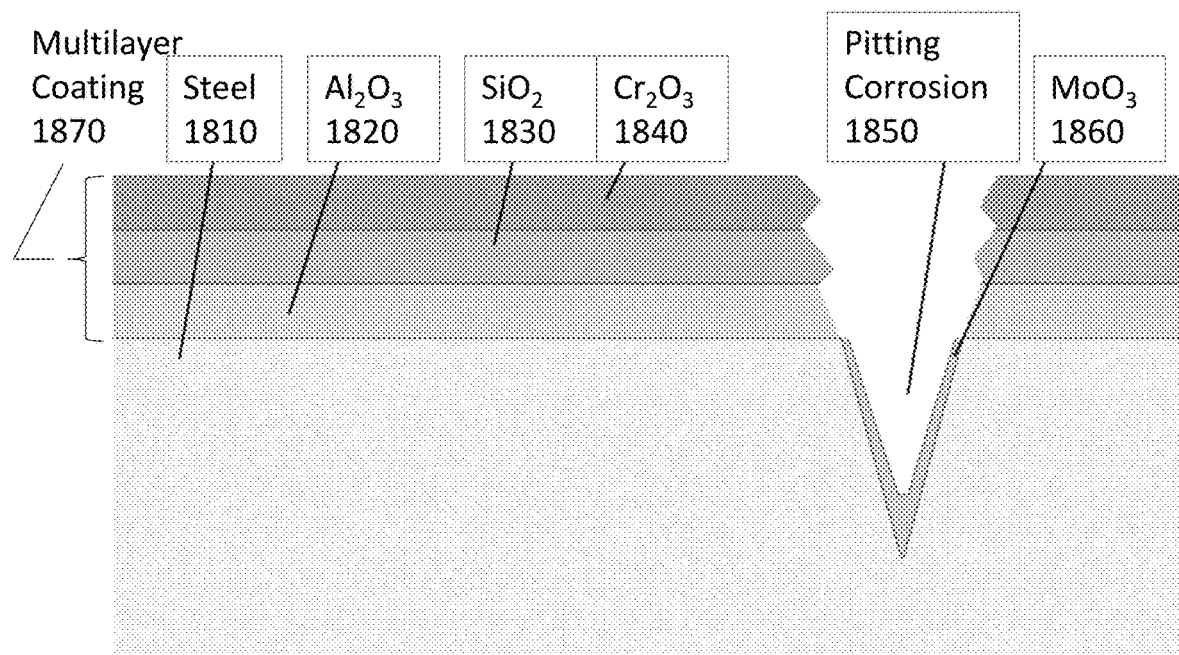

FIG. 18 schematically illustrates embodiments of Fe—Cr—Mo—Al—Si stainless steel alloys as a corrosion resistant coating on steel components. FIG. 18 shows a schematic embodiment of a multilayer oxide layer that illustrates how the metal atoms in an alloy diffuse to individual oxide layers on the surface of the alloy. The bottom material in FIG. 18 is a steel component 1810. A Fe—Cr—Mo—Al—Si alloy coating has been deposited on the steel component, and the aluminum, silicon, and chromium elements have diffused to form a multilayer coating of metal oxide layers 1870. The aluminum oxide layer 1820 is closest to the steel component 1810. The next layer up from the aluminum oxide layer is a silicon dioxide layer 1830. The chromium oxide layer 1840 is on the surface of the multilayer oxide coating. 1870.

A pit (e.g., crevice) has been formed by chloride ion ($Cl^-$) corrosion through the multilayer oxide coating and extending into the steel component. While the oxide layers in the multilayer oxide coating are effective at preventing oxidative corrosion from oxygen, they are less effective at preventing $Cl^-$ pitting corrosion. However, molybdenum atoms in the stainless steel diffuse to the pitting surfaces caused by the $Cl^-$ pitting corrosion, and form a $MoO_3$ passivating native oxide layer 1860 on the corroded surface. The $MoO_3$ passivating layer prevents, and/or resists further corrosion by the chloride ions.

Figure 19:
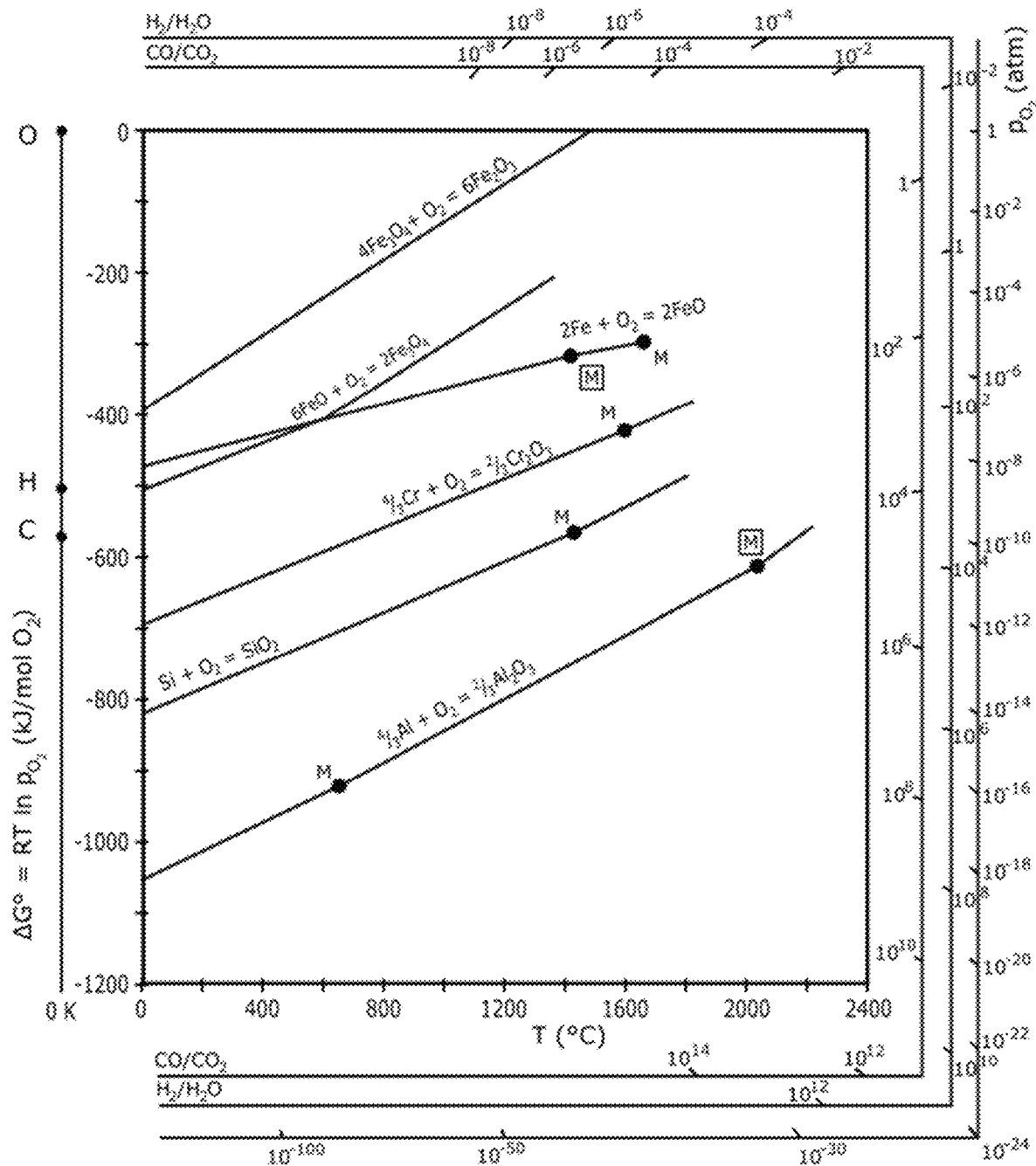
FIG. 19 shows an Ellingham diagram presenting the relative driving force for the oxide formation among the constituent elements in the present invention.

FIG. 19 shows an Ellingham diagram presenting the relative driving force for the oxide formation among the constituent elements in the present invention. An Ellingham diagram is a graph showing the temperature dependence of the stability of compounds. The Ellingham diagram plots the Gibbs free energy change ($\Delta G$) for each oxidation reaction as a function of temperature. The diagram has particular utility in identifying which metal oxide layers in a multilayer oxide coating are likely to form the most stable oxides (having the largest absolute value of $\Delta G$), and thus allow the determination of the stacking order of the oxide layers. This is because the more stable oxide layers will tend to form closer to the steel component.

As shown in FIG. 19, $Al_2O_3$ has the largest absolute value of $\Delta G$, and it is the layer closest to the steel layer. SiO2 has the next largest absolute value of $\Delta G$, and it is the layer on top of the $Al_2O_3$ layer. $Cr_2O_3$ has the smallest absolute value of $\Delta G$, and it is the layer on top of the multilayer oxide coating.

The selection of chromium, molybdenum, aluminum, and silicon as the primary, secondary, and tertiary corrosion resistant stainless steel alloy metals is based on optimizing the structure and chemical resistance of the alloy. The structure is optimized to form a body centered cubic (e.g., BCC) ferrite matrix, and the chemical resistance is optimized to resist corrosion of steel by both oxygen and chloride.

Figure 20:
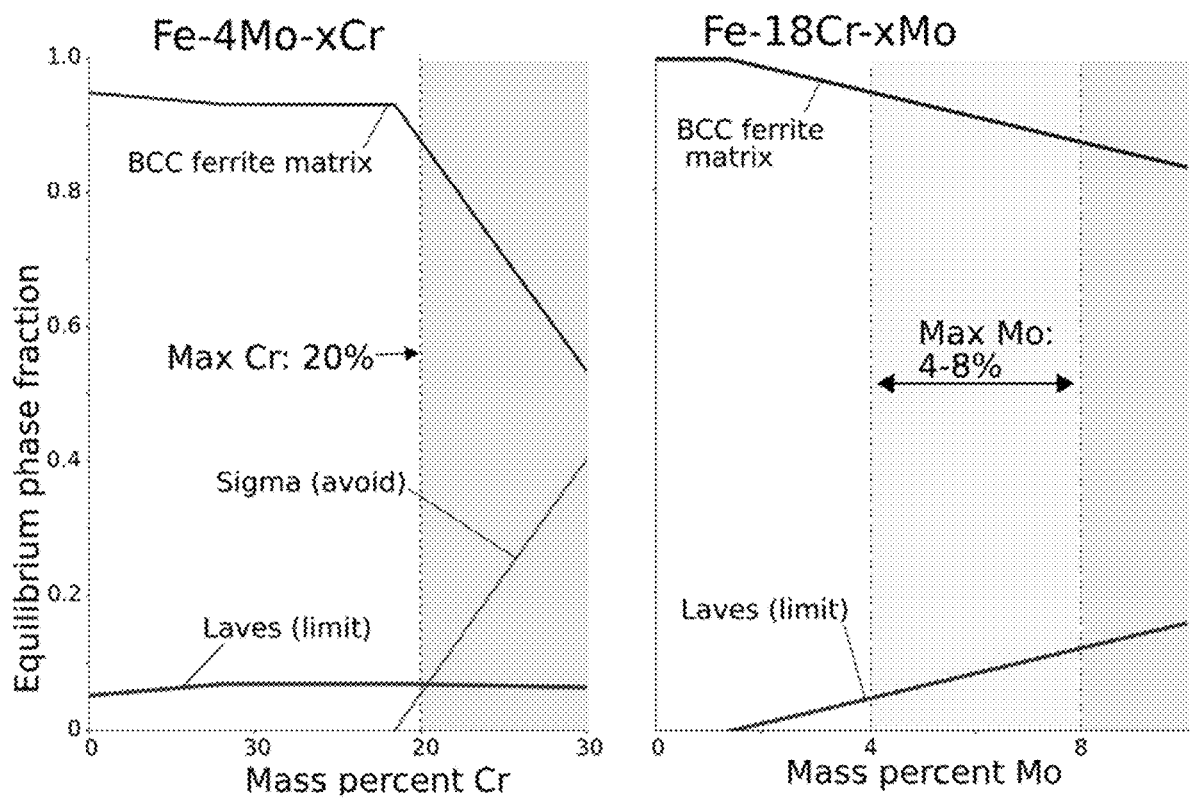
FIG. 20 shows equilibrium phase compositions for ranges of Cr and Mo contents in stainless steel alloys of iron, chromium, and molybdenum.

FIG. 20 shows equilibrium phase compositions for ranges of Cr and Mo contents in stainless steel alloys of iron, chromium, and molybdenum. The elemental ranges in an exemplary composition of matter may be chosen using following considerations. Iron (Fe) is selected as the primary element for the alloy due to its abundance, affordability, strength, and ductility. Chromium (Cr) is selected as the main alloying element in order to achieve overall corrosion resistance for the alloy, which is achieved by having a minimum 16 wt % Cr in order to form a stable, protective $Cr_2O_3$ layer while having no more than 20 wt % Cr in order to limit or prevent the formation of deleterious metallic phases such as sigma phase and laves phase. Molybdenum (Mo) is included in a minimum of 3 wt % in order to achieve additional corrosion resistance in concentrated halide media, especially high chloride aqueous environments, and is limited to no more than 4-8 wt %, in order to limit the formation of chi phase, sigma phase, and laves phase intermetallics. Aluminum (Al) can be included in order to form an additional $Al_2O_3$ protective oxide layer, with a limit of no more than 4 wt % in order to avoid the formation of brittle $Fe_3Al$ precipitates. Silicon (Si) can also be included in order to form an additional $SiO_2$ protective oxide layer, with a limit of no more than 2 wt % in order to avoid the formation of brittle $Cr_3Si$ precipitates. Manganese (Mn) is included in a small amount (0.1-0.5 wt %) in order to consume sulfur impurity in the molten iron via the formation of small MnS precipitates. Carbon (C) and nitrogen (N) are limited to 0.1 wt % to limit the formation of carbide and nitride phases in the material. Sulfur (S) is limited to 0.05 wt % in order to avoid the severe embrittlement that sulfur can cause to steels.

Range of Potential Compositions

Various embodiments of the invention have the following elements within the specified ranges to achieve the microstructure and utility described below.

In accordance with an embodiment of the invention, a corrosion resistant stainless steel alloy composition having a BCC ferrite matrix includes:
- 12-25 weight percent chromium (Cr);
- 2-10 weight percent molybdenum (Mo); and at least one or more of:
- 0-10 weight percent aluminum (Al);
- 0-5 weight percent silicon (Si);
- 0-5 weight percent nickel (Ni);
- 0-1.0 weight percent manganese (Mn);
- 0.0-0.1 weight percent carbon (C);
- 0.0-0.1 weight percent nitrogen (N); and
- 0.0-0.05 weight percent sulfur (S); and
- the balance of iron (Fe).

In accordance with an embodiment of the invention, a corrosion resistant stainless steel alloy composition having a BCC ferrite matrix includes:
- 16-20 weight percent chromium (Cr);
- 3-6 weight percent molybdenum (Mo); and at least one or more of:
- 0-4 weight percent aluminum (Al);
- 0-2 weight percent silicon (Si);
- 0-0.1 weight percent nickel (Ni);
- 0.1-0.5 weight percent manganese (Mn);
- 0.0-0.1 weight percent carbon (C);
- 0.0-0.1 weight percent nitrogen (N):
- 0.0-0.05 weight percent sulfur (S); and
- the balance of iron (Fe).

In accordance with an embodiment of the invention, a corrosion resistant stainless steel alloy composition having a BCC ferrite matrix includes:
- 18 weight percent chromium (Cr);
- 6 weight percent molybdenum (Mo);
- 4 weight percent aluminum (Al);
- 2 weight percent silicon (Si); and
- the balance of iron (Fe).

In accordance with an embodiment of the invention, a corrosion resistant stainless steel alloy composition having a BCC ferrite matrix includes:
- 18 weight percent chromium (Cr);
- 3 weight percent molybdenum (Mo);
- 4 weight percent aluminum (Al);
- 2 weight percent silicon (Si); and
- the balance of iron (Fe).

In accordance with an embodiment of the invention, a corrosion resistant stainless steel alloy composition having a BCC ferrite matrix includes:
- 18 weight percent chromium (Cr);
- 8 weight percent molybdenum (Mo);
- 5 weight percent aluminum (Al); and
- the balance of iron (Fe).

In accordance with an embodiment of the invention, a corrosion resistant stainless steel alloy composition having a BCC ferrite matrix includes:
- 18 weight percent chromium (Cr);
- 8 weight percent molybdenum (Mo);
- 2 weight percent silicon (Si); and
- the balance of iron (Fe).

In accordance with an embodiment of the invention, a corrosion resistant stainless steel alloy composition having a BCC ferrite matrix includes:
- 18 weight percent chromium (Cr);
- 4 weight percent molybdenum (Mo); and
- the balance of iron (Fe).

General Method of Fabrication

Formation Steps

To synthesize the alloy, one skilled in the art can employ the following steps. It should be noted that this method is substantially simplified from a longer process that normally would be used to synthesize the alloy. Accordingly, the process of synthesizing the alloy is expected to have many steps that those skilled in the art likely would use. In addition, some of the steps may be performed in a different order than that shown, or at the same time.

Those skilled in the art therefore can modify the process as appropriate. Moreover, as noted above and below, the materials and structures noted are but one of a wide variety of different materials and structures that may be used. Those skilled in the art can select the appropriate materials and structures depending upon the application and other constraints. Accordingly, discussion of specific materials and structures is not intended to limit all embodiments.

One process of various embodiments has the following steps.
- Provide a mixture of the raw materials in the appropriate weight fractions, as described above for a corrosion resistant stainless steel alloy composition having a BCC ferrite matrix.
- Provide a furnace for melting the metal mixture.
- Heat the metal mixture in the furnace to a temperature between about 1600 C and about 2000 C to form a liquid metal mixture melt.
- Cool the liquid metal mixture melt to an intermediate temperature between about 1000 C and about 1300 C over a first duration of time to initiate a solidification process.
- Quench the liquid metal mixture melt to a temperature between about 400 C and about 600 C over a second duration of time, because the quenching limits the formation of carbide precipitates.
- Temper the metal mixture at the temperature between about 450 C and about 600 C for a duration of time of between about 10 minutes and about 60 minutes.
- Cool the metal mixture in the absence of active heating, wherein the metal mixture comprises ferritic stainless steel alloy.

The first duration of time may be between 5 minutes and 100 minutes. The second duration of time may be between 0.5 seconds and 10 seconds.

EXAMPLES

The following examples are intended to further illustrate the disclosure and its preferred embodiments.

Example 1: Cost Effective Option

Grade 304 SS Coating, 20-40 Micron Coating Thickness, Cold Spray Deposition

Example 1 represents an embodiment of the invention which is most oriented towards reduction in costs. This example employs 304 SS as the corrosion-resistant coating layer due to its good general corrosion resistance as well as the affordability of this coating material in comparison to other suitable corrosion-resistant coating materials.

Cold spray deposition is employed as the method of applying the coating to the carbon steel bar due to its relatively low cost and high throughput. A coating thickness of 20-40 microns is selected because this thickness range allows for confidence that the corrosion resistant coating is fully covering the surface of the material, while also limiting the use of the coating material in order to reduce the overall cost of the coated bar. The cold spray deposition should be performed near the end of the production process on the finished or near-finished bar.

Example 2

Grade 316 SS Coating, 25-50 Micron Coating Thickness, Cold Spray Deposition

Example 2 represents an embodiment of the invention in which substantial chloride corrosion resistance is achieved in addition to general oxidation resistance, while reducing the cost but using a relatively thin coating layer. This example uses 316 SS as the corrosion-resistant coating layer which provides the protection of a conventional stainless steel with substantial additional corrosion resistance to chloride attack due to the increased molybdenum content.

Cold spray deposition is chosen in this example due to the ability to inexpensively produce coating of the appropriate thickness with a high throughput. A coating thickness of 25-50 micron is selected in order to provide robust corrosion resistance while limiting cost increase. The cold spray deposition should be performed near the end of the production process on the finished or near-finished bar.

Example 3

Grade 316 SS Coating, 40-80 Micron Coating Thickness, Weld Overlay

Example 3 represents an embodiment of the invention with substantial chloride corrosion resistance while also being more robust against bending, scratching, or other processes which may damage the surface coating. Again, with grade 316 SS used as the corrosion-resistant coating layer, this example will provide significant resistance to corrosion in chloride environments.

In this example, weld overlay is used to deposit the coating material onto the bar. The coating thickness of 40-80 micron in this example provides a more robust, mechanically sound coating which can more readily withstand deformation of the bar while maintaining corrosion protection. As such, the weld overlay process should occur towards the beginning of the bar production process. For example, the weld overlay process may be applied to coating a large billet which is rolled down to the finished bar dimension.

Example 4

Fe-18Cr-6Mo-4Al-2Si SS, 25-50 Micron Coating Thickness, Cold Spray Deposition

Example 4 is an embodiment which utilizes a highly corrosion-resistant coating material, Fe-18Cr-6Mo-4Al-2Si. This alloy provides exceptional overall corrosion resistance, employing multiple elements which form protective, passive oxide films in addition to chloride attack resistance provided by Mo. Although this coating material typically is more expensive, the coating thickness of 25-50 microns which is selected for this example allows for a balance between performance and cost.

Cold spray deposition is chosen in this example due to the ability to produce coating of the appropriate thickness with a high throughput. The cold spray deposition should be performed near the end of the production process on the finished or near-finished bar.

Example 5

Fe-18Cr-6Mo-4Al-2Si SS, 40-80 Micron Coating Thickness, Weld Overlay Deposition

Example 5 provides robust bar protection and performance, utilizing a Fe-18Cr-6Mo-4Al-2Si alloy. A relatively thick coating of 40-80 micron allows the coating to withstand significant deformation, scratching, and other damage which could degrade the performance of the coating.

For this example, weld overlay is used in order to deposit the protective coating material onto the bar. As such, the weld overlay process should occur towards the beginning of the bar production process, with the weld overlay applied to a large billet which is rolled down to the finished bar dimension.

Example 6

Maximum corrosion-resistance composition; Fe-18Cr-6Mo-4Al-2Si—0.1C

This example demonstrates optimization of the composition for the best corrosion resistance possible by maximizing the content of the protective oxide formers: Cr, Al, and Si along with Mo for additional resistance to halide corrosion attack.

Figure 21:
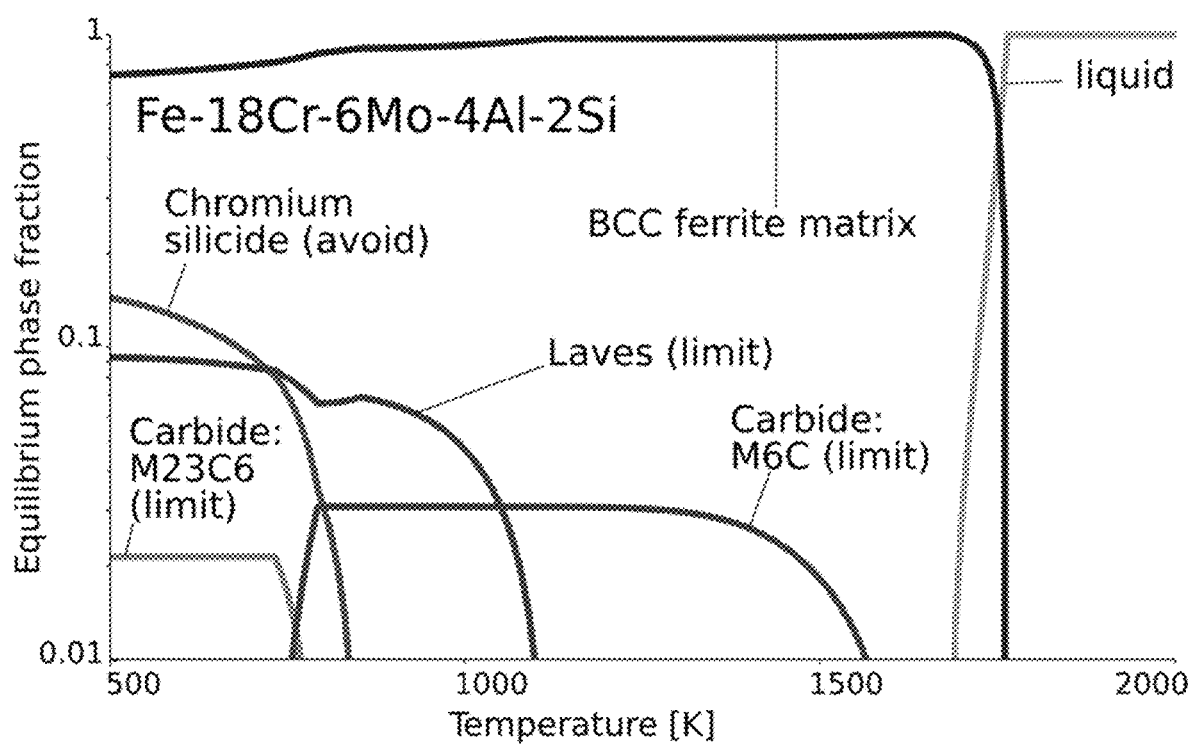
FIG. 21 shows an equilibrium phase fraction plot for an example Fe—Cr—Mo—Al—Si composition demonstrates the secondary phases that should be limited or avoided completely.

FIG. 21 shows an equilibrium phase fraction plot for an example Fe—Cr—Mo—Al—Si composition demonstrates the secondary phases that should be limited or avoided completely. Time-temperature-transformation curve for an example Fe—Cr—Mo—Al—Si composition demonstrates how the temperature profile can be controlled in order to limit/avoid the formation of secondary phases.

Figure 22:
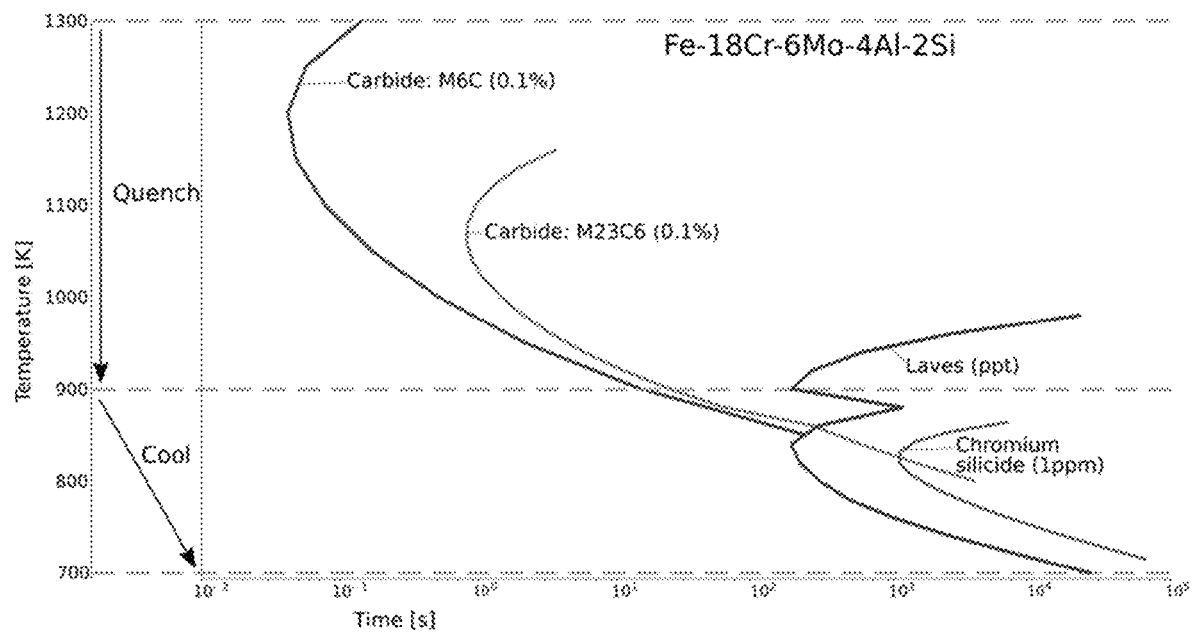
FIG. 22 illustrates time-temperature-transformation curve for an example Fe—Cr—Mo—Al—Si composition.

FIG. 22 illustrates time-temperature-transformation curve for an example Fe—Cr—Mo—Al—Si composition demonstrates how the temperature profile can be controlled in order to limit/avoid the formation of secondary phases.

Due to the large Mo content in this composition, carbide formation is especially rapid for the M6C phase, so rapid quenching down to 900K (~625C) is critical to limit the overall volume fraction of carbide precipitates, followed by more gradual cooling down to room temperature after quenching. The benefit of this large Mo content is that resistance to chloride corrosion attack should be excellent.

Example 7

Balanced Multi-Oxide Composition; Fe-18Cr-3Mo-4Al-2Si

This example demonstrates a composition with reduced Mo concentration in order to reduce the cost of the material and reduce the likelihood of forming secondary phases, especially carbide precipitates and Laves phase precipitates. Overall this composition should still have excellent overall corrosion resistance, but less resistance to chloride attack compared with example #1. But, the cost is reduced by Mo content reduction, and the thermal processing requirements are somewhat alleviated as well.

Figures 3, 6, 23:
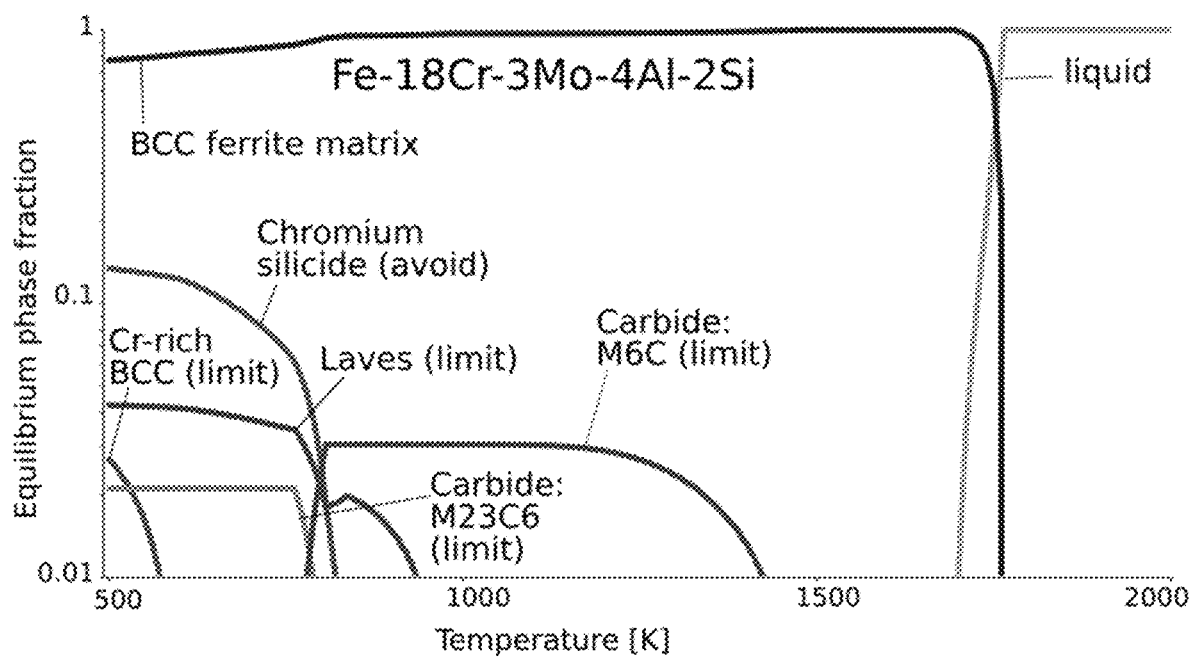
FIG. 23 shows a phase composition map for Fe-18Cr-3Mo-4Al-2Si shows the presence of deleterious secondary phases at low temperatures.

FIG. 23 shows a phase composition map for Fe-18Cr-3Mo-4Al-2Si shows the presence of deleterious secondary phases at low temperatures, especially $Cr_3Si$, which are limited in the final microstructure through thermal process control.

Figure 24:
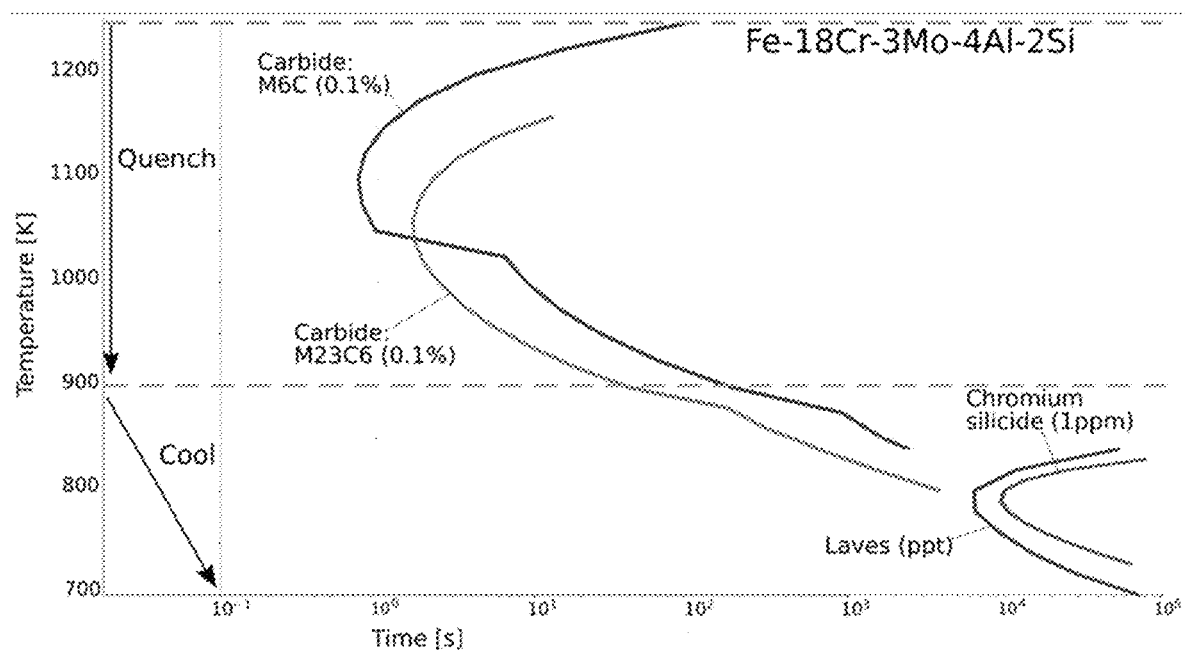
FIG. 24 shows a time-temperature-transformation diagram for Fe-18Cr-3Mo-4Al-2Si.

FIG. 24 shows a time-temperature-transformation diagram for Fe-18Cr-3Mo-4Al-2Si, demonstrating the kinetics of formation of secondary phases in this example Given the kinetic information demonstrated above in FIG. 7, there should be a rapid quench of the material, lowering the temperature from 1200K to 900K as rapidly as possible to minimize the formation of carbide precipitates. Following the quench, the material is more gradually cooled from 900K to 700K, followed by air cooling from 700K to ambient conditions.

Example 8

Double Oxide—Chromium and Aluminum; Fe-18Cr-8Mo-5Al

This example demonstrates a composition protected by chromia and alumina layers without the use of silicon. Molybdenum is included for halide/pitting protection.

Example 8 achieves corrosion resistance through the inclusion of Cr, along with additional significant halide corrosion resistance due to the large Mo content. The presence of Al allows for the formation of a secondary protective alumina passive layer which further enhances the corrosion resistance of this composition. The exclusion of Si from this composition is expected to somewhat lower the oxidation resistance of this composition relative to other example compositions, but the formation of $Cr_3Si$ is no longer thermodynamically favored as well, which is beneficial to the microstructure of the material.

Figure 25:
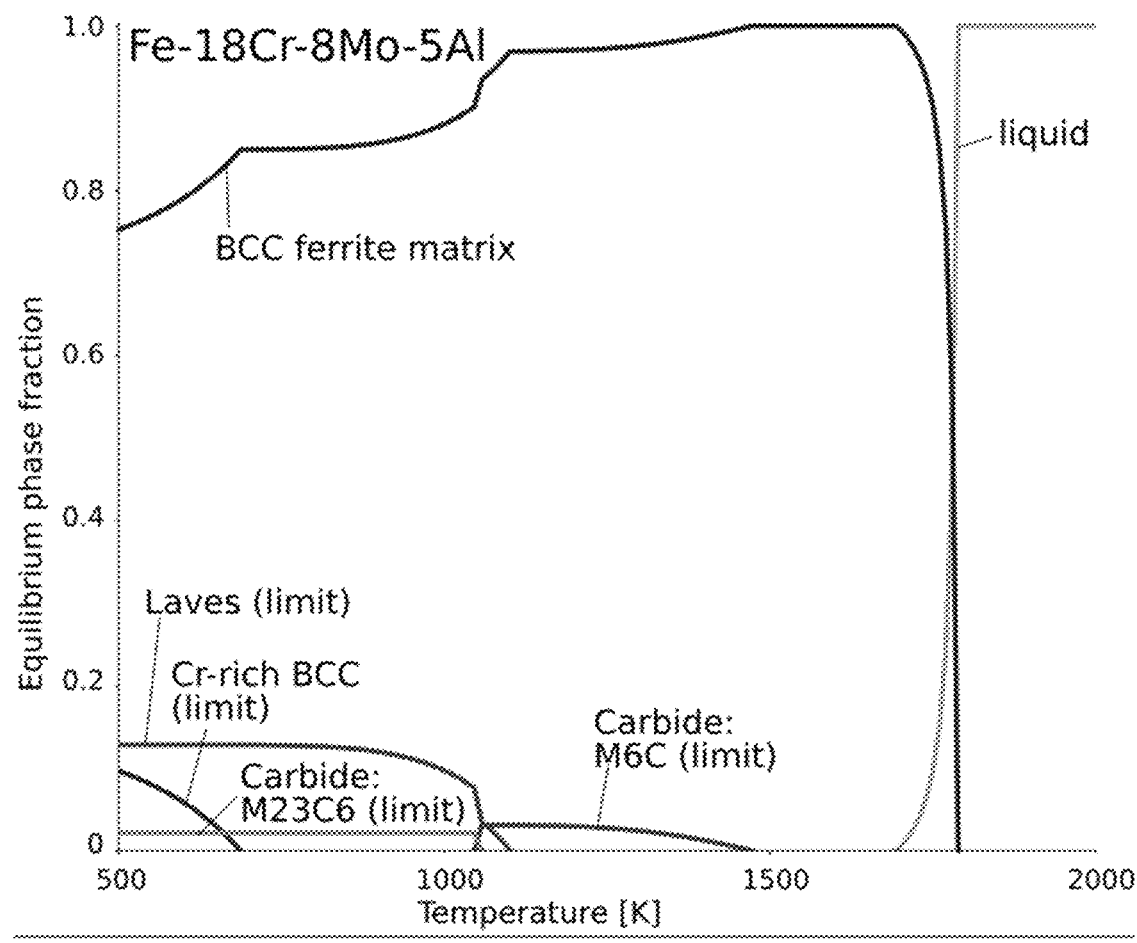
FIG. 25 shows an equilibrium phase fraction plot for an example Fe—Cr—Mo—Al composition demonstrates the secondary phases that should be limited or avoided completely.

FIG. 25 shows an equilibrium phase fraction plot for an example Fe—Cr—Mo—Al composition demonstrates the secondary phases that should be limited or avoided completely.

Figure 26:
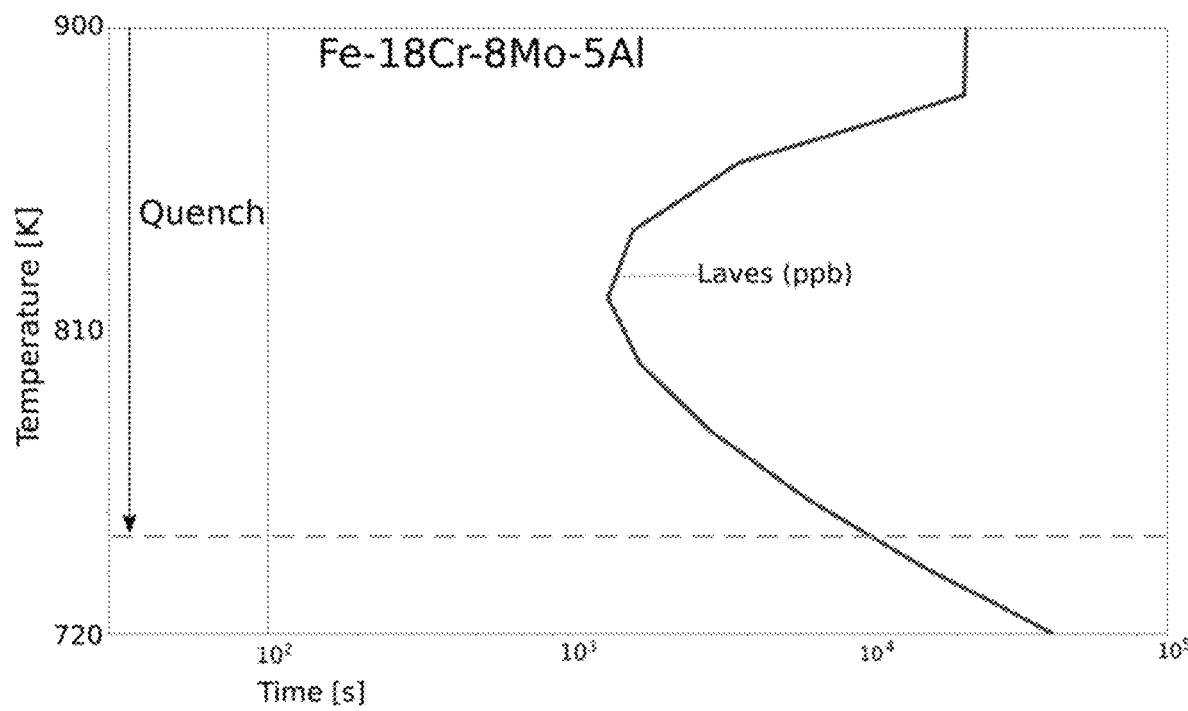
FIG. 26 shows a time-temperature-transformation diagram for Fe-18Cr-8Mo-5Al.

FIG. 26 shows a time-temperature-transformation diagram for Fe-18Cr-8Mo-5Al, demonstrating the kinetics of formation of secondary phases in this example For example 8, the primary deleterious phase of concern is Laves phase, which begins to be thermodynamically favorable below 1000 K and becomes kinetically favorable (begins to significantly nucleate and grow) around 900 K. During the synthesis of this material, a rapid quench should be performed in order to rapidly cool the material from 950 K to 750 K in order to limit the formation of Laves phase precipitates which tend to embrittle the material. After quenching to 750 K, the material can be gradually cooled to ambient conditions.

Example 9

Double Oxide; Fe-18Cr-8Mo-2Si

Example 9 achieves corrosion resistance through the inclusion of Cr, along with additional significant halide corrosion resistance due to the large Mo content. The presence of Si allows for the formation of a secondary protective silica ($SiO_2$) passive layer which further enhances the corrosion resistance of this composition. The exclusion of Al from this composition is expected to somewhat lower the oxidation resistance of this composition relative to other example compositions, but should reduce the potential for nitride and carbide precipitation. Especially notable phases that can potentially form are the chi and sigma phases, which could embrittle the material if the volume fraction of these precipitates becomes too large. In order to limit the volume fraction of these phases, the material should be quenched in order to rapidly cool the material from 1200 K to 900 K, followed by gradual cooling to ambient temperature.

Figure 27:
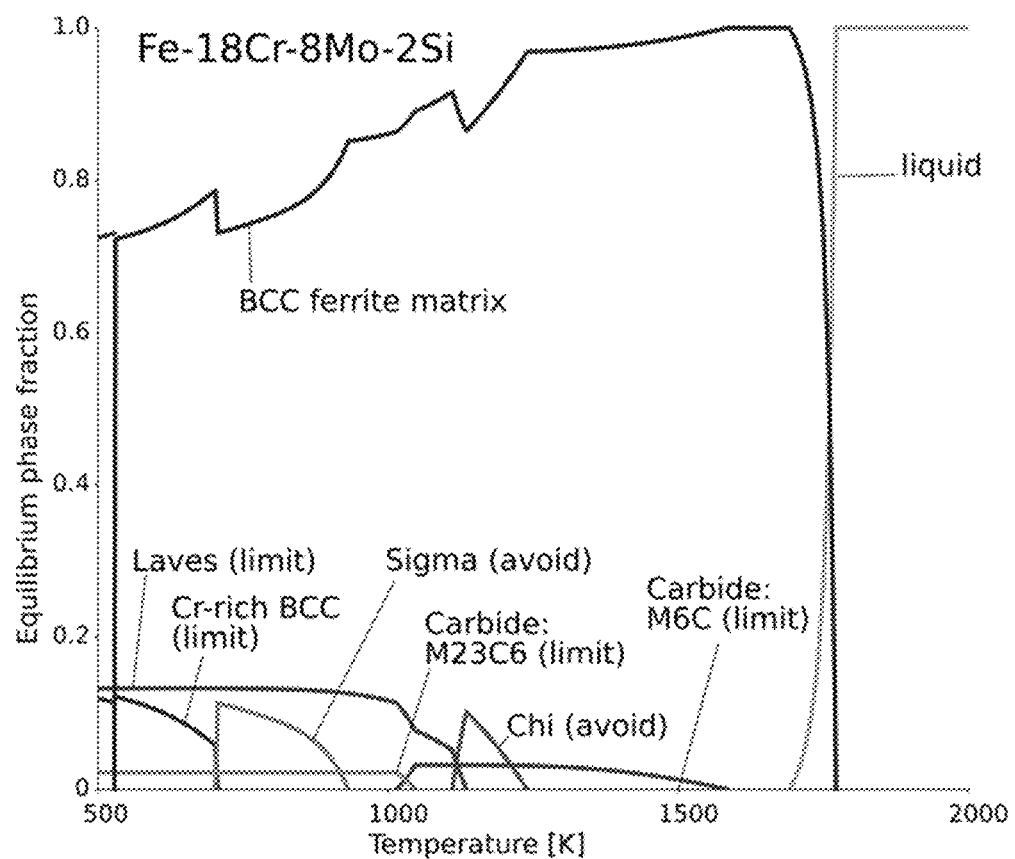
FIG. 27 illustrates an equilibrium phase fraction plot for an Fe—Cr—Mo—Si alloy demonstrates the secondary phases that should be limited or avoided completely.

FIG. 27 illustrates an equilibrium phase fraction plot for an Fe—Cr—Mo—Si alloy demonstrates the secondary phases that should be limited or avoided completely.

Figure 28:
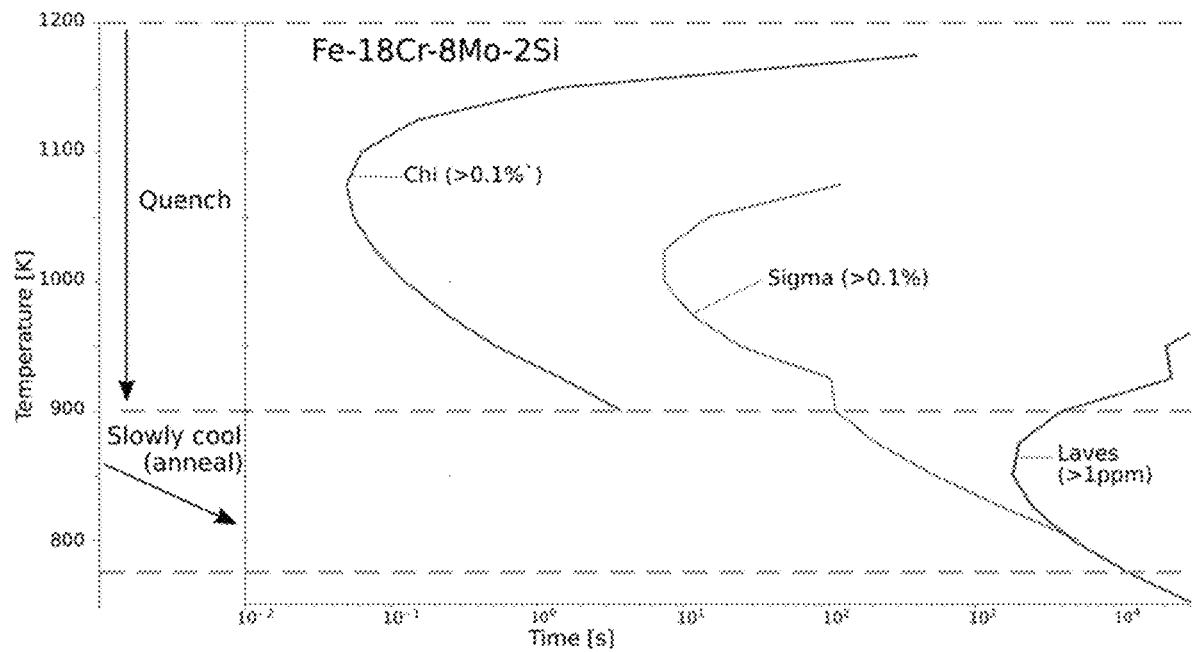
FIG. 28 shows a time-temperature-transformation diagram for Fe-18Cr-8Mo-2Si.

FIG. 28 shows a time-temperature-transformation diagram for Fe-18Cr-8Mo-2Si demonstrating the kinetics of formation of secondary phases in this example.

Example 10

Single Oxide—Fe-18Cr-4Mo

Example 10 is a simple example, where the only alloying additions to Fe are Cr and Mo. Good overall corrosion resistance is achieved through the large Cr concentration, while a significant additional resistance to chloride corrosion attack is achieved through the addition of 4 wt % Mo. The Cr and Mo concentrations are low enough that sigma phase formation is not thermodynamically favored, but chi phase can form during the material synthesis process, and therefore certain processing steps should be taken to avoid formation of chi phase and resulting embrittlement of the material.

Figure 29:
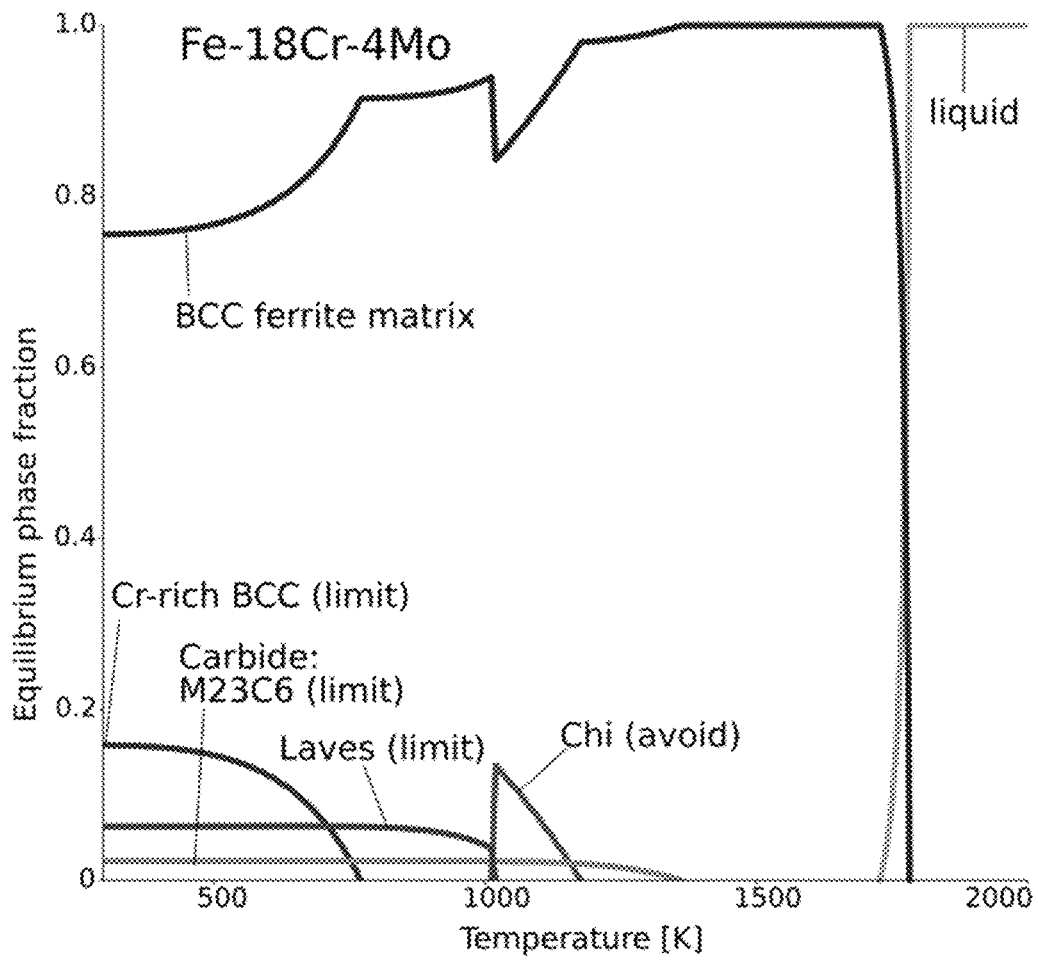
FIG. 29 illustrates an equilibrium phase fraction plot for an Fe—Cr—Mo alloy demonstrates the secondary phases that should be limited or avoided completely.

FIG. 29 illustrates an equilibrium phase fraction plot for an Fe—Cr—Mo alloy demonstrates the secondary phases that should be limited or avoided completely.

Figure 30:
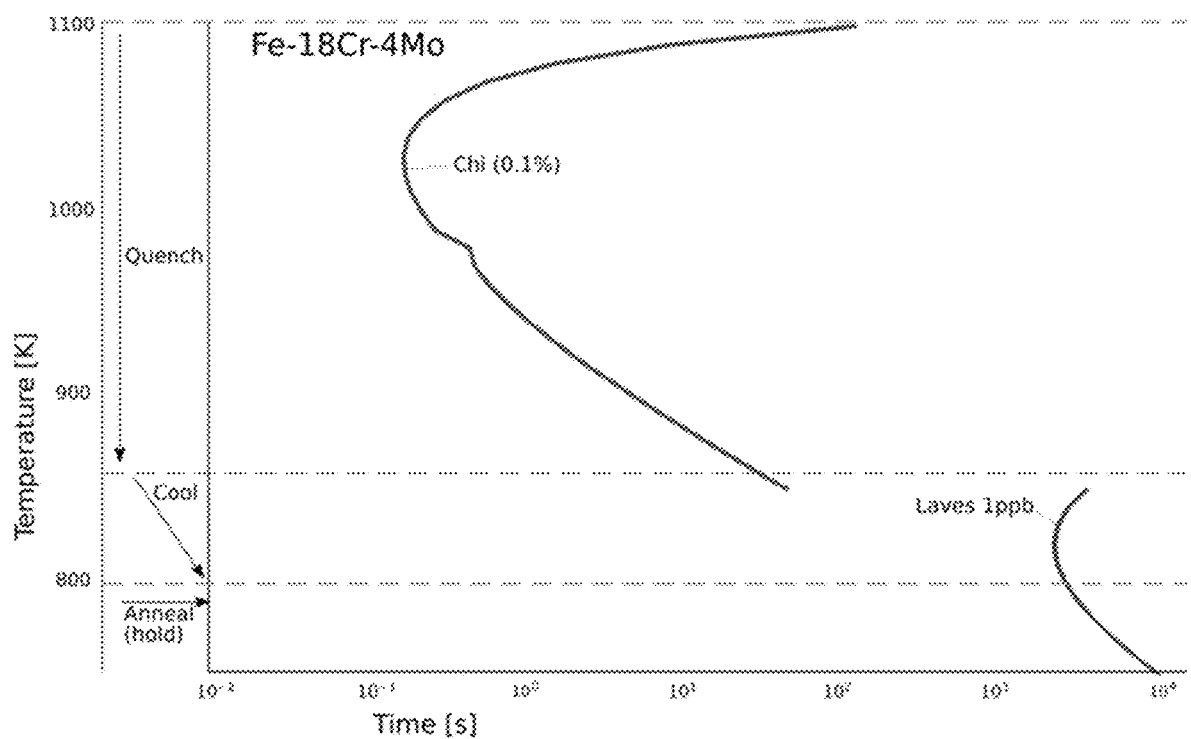
FIG. 30 shows a time-temperature-transformation diagram for Fe-18Cr-4Mo.

FIG. 30 shows a time-temperature-transformation diagram for Fe-18Cr-4Mo demonstrating the kinetics of formation of secondary phases in this example In order to minimize the formation of chi phase in the synthesis of Example 10, quenching must be performed in order to rapidly lower the temperature of the material from 1100 K to 850 K, followed by holding the material at 800 K for 10 minutes to briefly anneal out any defects and possible chi phase which may have formed during the solidification process. Following this brief annealing step, the material can be air cooled from 800 K to ambient conditions.

Example 11

Further examples of compositions with various amounts of alloying elements

Embodiments include compositions with various amounts of alloying elements, including those with other elements not listed here. Further examples of compositions within the scope of the present invention include:
Fe-12Cr-2Mo; Fe-12Cr-5Mo-1Si—0.4Mn-0.3C; Fe-22Cr-6Mo-0.2Mn; Fe-22Cr-3Al-2Mo-1Si—0.2Mn-0.2C; Fe-20Cr-8Mo-4Al-2Si; Fe-22Cr-3Al-0.1C; Fe-18Cr-2Mo-1Si—0.3Mn; Fe-12-Cr-2Mo-1W; Fe-12-Cr-2Mo-0.15V; and Fe-16Cr-4Ni-2Mo.

The embodiments of the invention described above are intended to be merely exemplary; numerous variations and modifications will be apparent to those skilled in the art.

Such variations and modifications are intended to be within the scope of the present invention as defined by any of the appended claims.

What is claimed is:

1. A steel component, comprising:
   a carbon steel reinforcement bar; and
   an outer layer coating metallurgically bonded to the carbon steel reinforcement bar, the outer layer coating comprising a stainless steel coating, wherein:
      the outer layer coating forms a corrosion resistant coating on the carbon steel reinforcement bar;
      the stainless steel coating comprises a face-centered cubic crystal structure; and
      a mean thickness of the outer layer coating is between 10 microns and 300 microns.

2. The steel component of claim 1, wherein there is an interdiffusion region between the carbon steel reinforcement bar and the outer layer coating where a composition of the interdiffusion region varies continuously from a composition of the outer layer coating to a composition of the carbon steel reinforcement bar, a width of the interdiffusion region is between 10 nanometers and 10 microns.

3. The steel component of claim 1, wherein the stainless steel coating comprises at least one of: a cold sprayed coating; a thermal sprayed coating; a plasma sprayed coating; a laser deposited coating; a twin wire arc sprayed coating; or an arc welding overlay coating.

4. The steel component of claim 1, wherein the stainless steel coating comprises at least one of 316 stainless steel, 2205 stainless steel, or 304 stainless steel.

5. The steel component of claim 4, wherein the at least one of 316 stainless steel, 2205 stainless steel, or 304 stainless steel is mixed with a metal carbide.

6. The steel component of claim 5, wherein the metal carbide comprises at least one of chromium carbide, molybdenum carbide, silicon carbide, or manganese carbide.

7. The steel component of claim 1, wherein the stainless steel coating comprises:
   12-25 weight percent chromium (Cr);
   2-10 weight percent molybdenum (Mo); and at least one or more of:
   0-10 weight percent aluminum (Al);
   0-5 weight percent silicon (Si);
   0-5 weight percent nickel (Ni);
   0-1.0 weight percent manganese (Mn);
   0.0-0.1 weight percent carbon (C);
   0.0-0.1 weight percent nitrogen (N); or
   0.0-0.05 weight percent sulfur(S); and
   the balance of iron (Fe).

8. The steel component of claim 1, wherein the stainless steel coating comprises:
   16-20 weight percent chromium (Cr);
   3-6 weight percent molybdenum (Mo); and at least one or more of:
   0-4 weight percent aluminum (Al);
   0-2 weight percent silicon (Si);
   0-0.1 weight percent nickel (Ni);
   0.1-0.5 weight percent manganese (Mn);
   0.0-0.1 weight percent carbon (C);
   0.0-0.1 weight percent nitrogen (N): or
   0.0-0.05 weight percent sulfur(S); and
   the balance of iron (Fe).

9. The steel component of claim 1, wherein the stainless steel coating has a sufficient ductility that:
   the reinforcement bar can be bent up to 180 degrees around an object of a diameter 3.5 times a diameter of the reinforcement bar without visible cracking of the stainless steel coating; or
   the stainless steel coating has an intrinsic ductility allowing at least a 5% elongation before failure.

10. A steel component, comprising:
    a carbon steel reinforcement bar; and
    an outer layer coating metallurgically bonded to the carbon steel reinforcement bar, the outer layer coating comprising a stainless steel coating, wherein:
    the outer layer coating forms a corrosion resistant coating on the carbon steel reinforcement bar;
    the stainless steel coating comprises a ferritic/austenitic duplex microstructure; and
    a mean thickness of the outer layer coating is between 10 microns and 300 microns.

11. The steel component of claim 10, wherein the stainless steel coating passivates the carbon steel reinforcement bar steel component against corrosion.

12. The steel component of claim 10, wherein the stainless steel coating is a cold sprayed coating.

13. The steel component of claim 10, wherein the stainless steel coating is weld overlay coating.

14. The steel component of claim 10, wherein the stainless steel coating is a twin wire arc spray coating.

15. The steel component of claim 10, wherein a mean grain size of the stainless steel coating is between 500 nanometers and 10 microns.

16. The steel component of claim 10, wherein the stainless steel coating comprises:
    16-20 weight percent chromium (Cr);
    3-6 weight percent molybdenum (Mo); and at least one or more of:
    0-4 weight percent aluminum (Al);
    0-2 weight percent silicon (Si);
    0-0.1 weight percent nickel (Ni);
    0.1-0.5 weight percent manganese (Mn);
    0.0-0.1 weight percent carbon (C);
    0.0-0.1 weight percent nitrogen (N): or
    0.0-0.05 weight percent sulfur(S); and
    the balance of iron (Fe).

* * * * *